US012248871B2

(12) United States Patent
Voelker

(10) Patent No.: US 12,248,871 B2
(45) Date of Patent: Mar. 11, 2025

(54) METHODS AND SYSTEMS FOR TRAINING MULTI-BIT SPIKING NEURAL NETWORKS FOR EFFICIENT IMPLEMENTATION ON DIGITAL HARDWARE

(71) Applicant: Applied Brain Research Inc., Waterloo (CA)

(72) Inventor: Aaron Russell Voelker, Stittsville (CA)

(73) Assignee: APPLIED BRAIN RESEARCH INC., Waterloo (CA)

( * ) Notice: Subject to any disclaimer, the term of this patent is extended or adjusted under 35 U.S.C. 154(b) by 1107 days.

(21) Appl. No.: 17/086,218

(22) Filed: Oct. 30, 2020

(65) Prior Publication Data

US 2021/0133568 A1 May 6, 2021

Related U.S. Application Data

(60) Provisional application No. 62/964,266, filed on Jan. 22, 2020, provisional application No. 62/929,722, filed on Nov. 1, 2019.

(51) Int. Cl.
*G06N 3/08* (2023.01)
*G06F 7/58* (2006.01)
*G06N 3/048* (2023.01)
*G06N 3/063* (2023.01)

(52) U.S. Cl.
CPC .............. *G06N 3/08* (2013.01); *G06F 7/588* (2013.01); *G06N 3/048* (2023.01); *G06N 3/063* (2013.01)

(58) Field of Classification Search
CPC .......... G06N 3/08; G06N 3/048; G06N 3/063; G06N 3/04; G06N 3/06; G06F 7/588
See application file for complete search history.

(56) References Cited

U.S. PATENT DOCUMENTS

2018/0189631 A1   7/2018 Sumbul
2019/0138882 A1*  5/2019 Choi ..................... G06N 3/048

OTHER PUBLICATIONS

S. Krithivasan, S. Sen, S. Venkataramani and A. Raghunathan, "Dynamic Spike Bundling for Energy-Efficient Spiking Neural Networks," 2019 IEEE/ACM International Symposium on Low Power Electronics and Design (ISLPED), Lausanne, Switzerland, 2019, pp. 1-6 (Year: 2019).*
Stuart et al., "Investigating the Effects of Dynamic Precision Scaling on Neural Network Training" Jan. 25, 2018, pp. 1-8 (Year: 2018).*

(Continued)

*Primary Examiner* — Kamran Afshar
*Assistant Examiner* — Brian J Hales
(74) *Attorney, Agent, or Firm* — Jenna L. Wilson; Wilson Lue LLP (firm)

(57) ABSTRACT

The present invention relates to methods of sparsifying signals over time in multi-bit spiking neural networks, methods of training and converting these networks by interpolating between spiking and non-spiking regimes, and their efficient implementation in digital hardware. Four algorithms are provided that encode signals produced by non-linear functions, spiking neuron models, supplied as input to the network, and any linear combination thereof, as multi-bit spikes that may be compressed and adaptively scaled in size, in order to balance metrics including the desired accuracy of the network and the available energy in hardware.

23 Claims, 14 Drawing Sheets

32-bit (ANN)

8-bit 6-bit 4-bit (2.8)-bit 2-bit (1.4)-bit 1-bit (SNN)

(56) References Cited

OTHER PUBLICATIONS

Krithivasan Sarada et al: "Dynamic Spike Bundling for Energy-Efficient Spiking Neural Networks", 2019 IEEE/ACM International Symposium on Low Power Electronics and Design (ISLPED), IEEE, Jul. 29, 2019 (Jul. 29, 2019), pp. 1-6, XP033612531.

Ylan Malone Stuart et al: "Investigating the Effects of Dynamic Precision Scaling on Neural Network Training", arxiv.org, Cornell University Library, 201 Olin Library Cornell University Ithaca, NY 14853, Jan. 25, 2018 (Jan. 25, 2018), XP 080854809.

* cited by examiner

METHODS AND SYSTEMS FOR TRAINING MULTI-BIT SPIKING NEURAL NETWORKS FOR EFFICIENT IMPLEMENTATION ON DIGITAL HARDWARE

The system and methods described herein are concerned with computing using single or multi-layer neural networks. More specifically, the present invention relates to methods for more efficiently implementing both spiking and non-spiking neural networks on digital hardware by adaptively configuring the bit-precision of the signals communicated between a network's processing nodes. This application claims priority to provisional application No. 62/929,722, filed Nov. 1, 2019 and provisional application No. 62/964,266, filed Jan. 22, 2020, the contents of which are herein incorporated by reference.

FIELD OF THE INVENTION

Background of the Invention

The use of artificial neural networks (ANNs) for machine learning tasks such as image classification, speech recognition, content recommendation, and automated text analysis has become increasingly widespread in recent years (Hinton et al., 2015). This increase in adoption has led the machine learning community has become much more interested in improving the efficiency of ANNs, especially in energy constrained deployment contexts involving mobile, edge, or IoT devices (Moloney, 2016; Zhang et al., 2017; McKinstry et al., 2018; Wang et al., 2019; Situnayake & Warden, 2019).

A number of approaches to improving the efficiency of ANNs have been previously developed, but since the vast majority of an ANN's time and energy is consumed by the multiply-accumulate (MAC) operations implementing the weighting of neural activities between layers (Sze et al., 2017), these approaches generally introduce hardware or software innovations for reducing the cost of MACs. On the hardware side, a number of special purpose ANN accelerators that implement circuits highly optimized for computing MACs have been introduced (e.g. Ginsburg et al., 2017; Jouppi et al., 2017). On the software side, techniques for pruning (Zhu & Gupta, 2017; Liu et al., 2018) and quantizing (Gupta et al., 2015; Courbariaux et al., 2015; McKinstry et al., 2018; Nayak et al., 2019) network weights have been widely used to reduce the use and size of MAC arrays.

An alternative approach to improving energy efficiency involves the use of spiking neural networks (SNNs), in which the activations of the computing elements in a network are quantized into temporally sparse, one-bit values (i.e., "spike" events). SNNs shift the focus away from MAC optimizations through their use of an event-based model of computation in which energy is only spent updating the activations of particular computing elements in response to particular inputs. The use of spikes not only reduces the volume of data communicated between nodes in the network (Furber et al., 2014), but also replaces the multipliers in the MAC arrays with adders, since the binary nature of spiking converts the typical sum over weight activity products in an ANN into a simple addition of weights (one weight for each spike). In short, SNNs perform fewer accumulation operations due to their use of temporally sparsity, and fewer multiplication operations due to their use of binary activation values. Together, these reductions in computational cost can provide orders of magnitude gains in energy efficiency on a range of practical machine learning tasks (Davies et al., 2018; Blouw et al., 2019).

However, the goal of maintaining state-of-the-art (SotA) accuracy when using SNNs has remained an elusive challenge, primarily due to spikes having only a single bit of precision. ANNs, by comparison, typically use 8 or more bits of precision. Efforts to ameliorate this challenge have largely focused on techniques for converting an ANN into an SNN that exhibits comparable performance characteristics with respect to task accuracy. These techniques can involve either training an ANN and replacing the activation functions with spiking neurons that have comparable firing rates (Hunsberger & Eliasmith, 2015), or retraining an ANN with spikes on the forward pass and a differentiable proxy on the backward pass (Huh & Sejnowski, 2018; Bellec et al., 2018; Zhang & Li, 2019). However, both techniques typically degrade model accuracy significantly—especially for recurrent networks.

Given the efficiency/accuracy tradeoffs presented by ANNs and SNNs, multiple hardware groups have started building hybrid architectures that support ANNs, SNNs, and mixtures thereof (Liu et al., 2018; Pei et al., 2019; Moreira et al., 2020)—for instance by supporting event-based activities, fixed-point representations, and a variety of multi-bit coding schemes. Related work has investigated the quantization of activation functions in the context of energy-efficient hardware (e.g., Jacob et al., 2018; McKinstry et al., 2018). Likewise, Hopkins et al. (2019) consider stochastic rounding and dithering as a means of improving the accuracy of spiking neuron models on low-precision hardware relative to their ideal ordinary differential equations (ODEs). However, none of these approaches account for the quantization errors that accumulate over time in the context of spike-based network communication. There also exist methods that introduce temporal sparsity into ANNs. One such example is channel gating (Hua et al., 2019), whereby the channels in a CNN are dynamically pruned over time.

To help analyze the quantization errors introduced by SNNs, some have viewed spiking neurons as one-bit quantizers, or analog-to-digital (ADC) converters (Chklovskii & Soudry, 2012; Yoon 2016; Ando et al. 2018; Neckar et al. 2018; Yousefzadeh et al. 2019a;b). But these methods have not been generalized to multi-bit or hybrid networks, nor have they been leveraged to interpolate between non-spiking and spiking networks during training. More precisely, neurons that can output multi-bit spikes have only been considered in the context of packets that bundle together neighbouring 1-bit spikes (Krithivasan et al., 2019).

Overall, while hybrid platforms that combine features of ANNs and SNNs present the alluring possibility of trading off accuracy for energy in task-dependent ways (Blouw et al., 2020), principled methods of leveraging such trade-offs are currently lacking. In particular, there is a need for methods that (a) analyze the quantization errors introduced by SNNs as a function of the bit-precision of spikes, and (b) allow for smooth interpolations between various the tradeoffs of model accuracy and model efficiency determined by this analysis.

To address this gap in the prior art, the present invention adopts tools from signal processing theory to first cast neural activation functions as quantizers with temporally-diffused error, and then exploit this error diffusion to optimally train networks while smoothly interpolating between non-spiking and spiking network regimes. The invention comprises a number of algorithms for training and implementing neural networks that use multi-bit spikes, where the degree of bit precision used for each spike defines a spectrum of computations that range between those implemented in pure SNNs (i.e. sparse 1-bit activations) and pure ANNs (dense 32-bit activations). The application of these algorithms in various processing mediums produces systems called hybrid-spiking neural networks (hSNNs). Exemplary embodiments of hSNNs are shown to outperform state-of-the-art recurrent neural network architectures with respect to task accuracy, while reducing activities to at most 3.74 bits on average with 1.26 significant bits multiplying each weight.

SUMMARY OF THE INVENTION

The present invention provides methods and systems for performing machine learning tasks with hybrid-spiking networks (hSNNs) that smoothly interpolate between ANN (i.e., 32-bit activities) and SNN (i.e., 1-bit activities) regimes. The invention introduces the novel method of "temporal dithering", which involves interpreting spiking neurons as one-bit quantizers that diffuse their quantization error across future time-steps. Applications of temporal dithering create an "augmented neural nonlinearity" that interpolates an arbitrary activation function, f, between non-spiking and spiking regimes through choice of the parameter $\omega > 0$, which acts like a time-step. The method can be readily applied to any neural network activation function at little additional cost, generalizes to quantizers with arbitrary bit-widths (even fractional), provides strong bounds on the quantization errors, and relaxes in the limit to the ideal ANN.

Temporal dithering can be embodied in at least four different techniques for creating augmented neural nonlinearities, all of which involve using the time-step parameter $\omega$ to determine the magnitude of any multi-bit spike emitted by a neuron (spike magnitudes can also importantly be interpreted as an integer-valued "number of spikes" emitted by a neuron on a given timestep). The first technique of dithered quantization involves applying a neural activation function, multiplying by $\omega$, updating the neuron's voltage variable, and rounding this variable down to the nearest integer to compute the magnitude of the spike (if any) at the current timestep. The second technique of stochastic rounding involves applying a neural activation function and multiplying by $\omega$ as before, but additionally computes a truncation error and compares this error to a random sample from the uniform distribution between 0 and 1 to determine whether to round up or down when determining the magnitude of the spike. The third technique of poisson spiking involves again applying the neural nonlinearity and multiplying by $\omega$, but determines the magnitude of the spike by sampling from a poisson distribution with a given expectation. The final technique of time dilation is simpler, and involves simulating a spiking neuron model forward $\omega$ units of time and counting the number to emitted spikes to determine the current spike magnitude. Intuitively, since temporal dithering always involves tracking quantization error across timesteps, all of these techniques present methods for finding the optimal number of spikes (or multi-bit spike magnitude) to emit on a given time step to minimize this quantization error. Overall, this invention provides methods of directly computing the number of spikes in O(1) time and memory per neuron, and varying the temporal resolution during training to interpolate between non-spiking and spiking models to allow optimization across the full set of hSNNs.

Moreover, the technical purpose of these algorithms is demonstrated in their efficient implementation in digital hardware. In particular, the present invention provides methods for efficiently implementing multi-bit spiking neural networks on digital hardware by avoiding the computation of MAC operations whenever a neuron does not emit any spikes on a given timestep; any time the number of spikes is zero the associated column of neural connection weights is skipped and neither multiplied nor accumulated downstream. The present invention also provides methods for exploiting hardware to reduce the amount of spike traffic between neurons, which is one of the most energy-intensive parts of simulating a network, particularly when it is too large to fit on one computing device. Using the technique of stochastic rounding, for example, it is possible to use dedicated hardware accelerators or lookup tables to compute the augmented non-linearity and collect random samples to determine the number of spikes emitted on a given timestep. Spikes from multiple neurons can then be compressed and organized into multi-bit packets with scalable bit-width so as to balance communication demands—in the form of reduced overall spike traffic—with the required precision of each neuron.

The concept of temporal dithering is motivated by some recent successes in training SNNs to compete with ANNs on standard machine learning benchmarks (Bellec et al., 2018; Stöckl & Maass, 2019; Pei et al., 2019), and introduces a novel way of parameterizing neural network activation functions in a manner that places ANNs and SNNs on opposite ends of the same spectrum. In other words, temporal dithering allows one to balance the accuracy of ANNs with the energy efficiency of SNNs by evaluating the continuum of networks in between these two extremes. Furthermore, temporal dithering can be used to train hSNNs that achieve superior accuracy to both ANNs and SNNs trained via conventional methods. As a result, the family of hSNNs defined by the present invention spans networks with any mixture of activity quantization throughout the architecture.

The main aspect of the present invention is to provide methods and systems for performing machine learning tasks with hybrid-spiking neural networks trained through the application of temporal dithering to perform their internal computations using multi-bit spikes. These methods involve defining a plurality of augmented nonlinearities through the application temporal dithering, and organizing these augmented nonlinearities into arbitrary feed-forward or recurrent network topologies through the creation of weighted connections between the nonlinearities, wherein for each augmented nonlinearity the output of the nonlinearity multiplied by a time-step corresponds to a number of spikes, and the spikes emitted from one or more augmented nonlinearities generates output from the neural network so as to perform an inference of some kind.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

These together with other objects of the invention, along with the various features of novelty which characterize the invention, are pointed out with particularity in the disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

Figure 1:
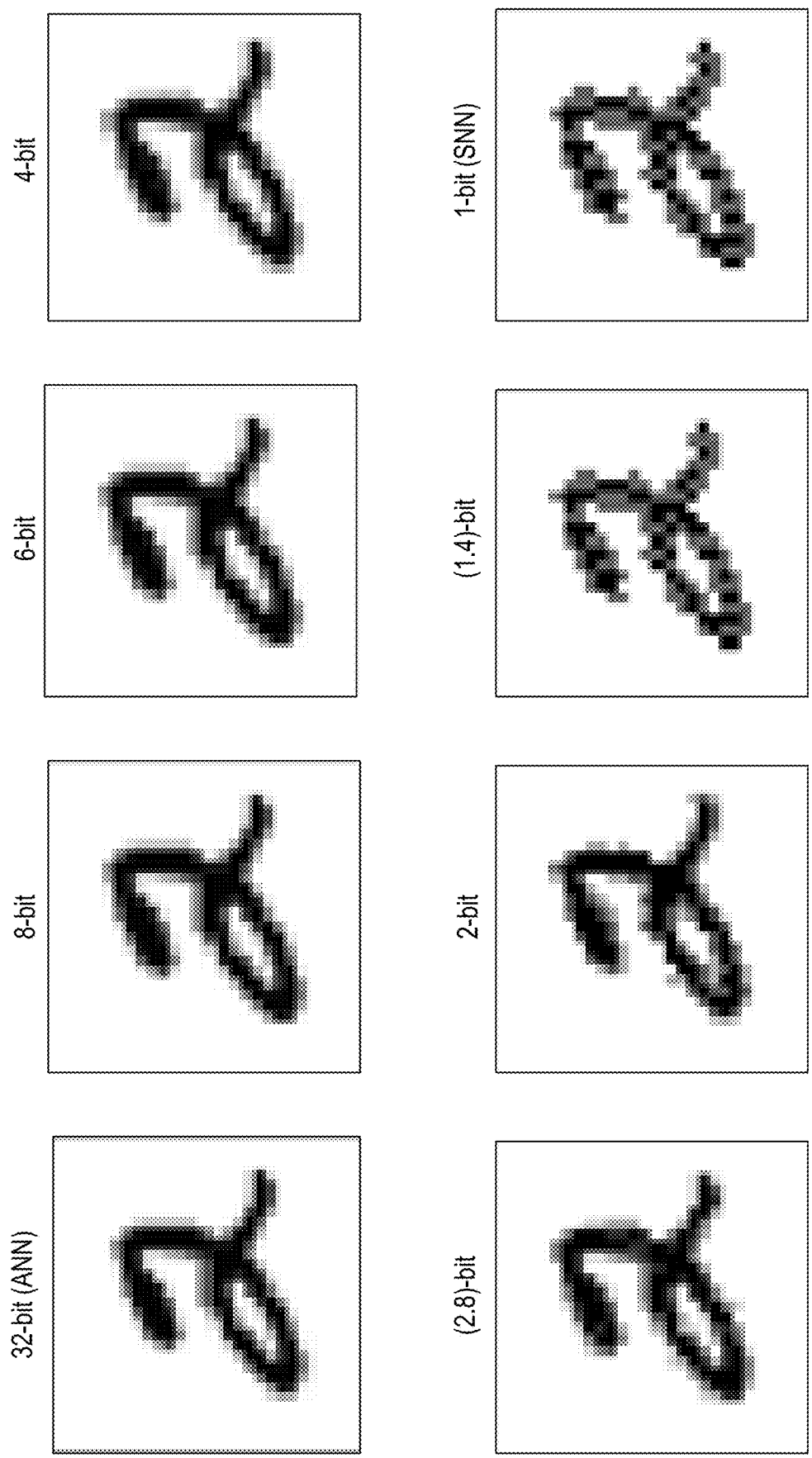
FIG. 1 illustrates the output of Algorithm 1, with f as the ReLU function, given an MNIST digit as input ($x_t$). The bit-width is varied as $\omega=2^{m-1}$; m=32 corresponds to the activities of a 32-bit ANN, whereas m=1 corresponds to those of an SNN.

Having summarized the invention above, certain exemplary and detailed embodiments will now be described below, with contrasts and benefits over the prior art being more explicitly described.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural and logical changes may be made without departing from the spirit and scope of the present invention. The following detailed description is, therefore, not to be taken in a limiting sense, and the scope of the present invention is defined by the appended claims and their equivalents.

The present invention is described in brief with reference to the accompanying drawings. Now, refer in more detail to the exemplary drawings for the purposes of illustrating non-limiting embodiments of the present invention.

As used herein, the term "comprising" and its derivatives including "comprises" and "comprise" include each of the stated integers or elements but does not exclude the inclusion of one or more further integers or elements.

As used herein, the singular forms "a", "an", and "the" include plural referents unless the context clearly dictates otherwise. For example, reference to "a device" encompasses a single device as well as two or more devices, and the like.

As used herein, the terms "for example", "like", "such as", or "including" are meant to introduce examples that further clarify more general subject matter. Unless otherwise specified, these examples are provided only as an aid for understanding the applications illustrated in the present disclosure, and are not meant to be limiting in any fashion.

As used herein, the terms "may", "can", "could", or "might" be included or have a characteristic, that particular component or feature is not required to be included or have the characteristic.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein.

Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For the purpose of clarity, details relating to technical material that is known in the technical fields related to the invention have not been described in detail so as not to unnecessarily obscure the present invention.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named element.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

For simplicity and clarity of illustration, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described herein in any way, but rather as merely describing the implementation of various embodiments as described.

The embodiments of the digital circuits described herein may be implemented in configurable hardware (i.e., FPGA), custom hardware (i.e., ASICs), including neuromorphic hardware with at least one interface. The input signal is consumed by the digital circuits to perform the functions described herein and to generate the output signal. The output signal is provided to one or more adjacent or surrounding systems or devices in a known fashion.

As used herein the term 'processing node' (sometimes also referred to as a 'neuron' for brevity) refers to spiking neurons, continuous rate neurons, or arbitrary nonlinear components used to make up a distributed system. The term 'spiking neuron model' refers to any method or algorithm used to compute the output of a spiking neuron given its input and current state. Examples of spiking neuron models include the integrate-and-fire, leaky integrate-and-fire, quadratic integrate-and-fire, Izhikevich, Wilson, and Mihalas-Niebur models. The term 'nonlinear function' refers to any method or algorithm for applying a nonlinear transformation to some input value to produce an output value. Examples of nonlinear functions include the rectified linear, leaky rectified linear, thresholded rectified linear, parametric rectified linear, sigmoid, tanh, softmax, log softmax, max pool, polynomial, sine, gamma, soft sign, heaviside, swish, exponential linear, scaled exponential linear, and gaussian error linear functions. The term 'augmented nonlinearity' refers to a modified nonlinear function or spiking neuron model for which zero or more internal state variables are used to track quantization error and determine what output to emit at each timestep to minimize this error. The term 'multi-bit spike' refers to a temporally sparse integer-valued output of an augmented nonlinearity that can be interpreted as the number of 1-bit spikes being emitted by the nonlinearity at a given moment in time.

As used herein the term 'spiking neural network' (SNN) refers to a collection of two or more spiking neurons coupled together via weighted connections such that inputs to the network can generate spikes in one or more of the neurons, which in turn produce network outputs. The term 'surrogate gradient' refers to any method or algorithm used to compute continuous and finite gradients for the parameters of an SNN whose true gradients are at times discontinuous or non-finite. The term 'artificial neural network' (ANN) refers to a collection of two or more non-spiking neurons coupled together via weighted connections such that inputs to the network can generate activation values in one or more of the neurons, which in turn produce network outputs. The term 'inputs' refers to any analog or digital signal that is used to drive activity in a neural network; inputs can be user-supplied, derived from sensors spanning arbitrary modalities, or drawn from arbitrary pre-existing datasets. The term 'metrics' refers to any numerical quantity used to measure or evaluate the performance characteristics of a neural network. Examples of metrics include network throughput, latency, memory consumption, signal bit-width, communication volume, signal-to-noise ratio, accuracy, loss, and energy consumption when implemented on a particular hardware device.

The described systems can be implemented using adaptive or non-adaptive components. The system can be efficiently implemented on a wide variety of distributed systems that include a large number of nonlinear components whose individual outputs can be combined together to implement certain aspects of the system as will be described more fully herein below.

The main aspect of the embodiment of the present invention is a set of methods for creating hybrid-spiking neural networks trained through the application of temporal dithering to perform their internal computations using multi-bit spikes. These methods involve defining a plurality of augmented nonlinearities through the application temporal dithering, and organizing these augmented nonlinearities into arbitrary feed-forward or recurrent network topologies through the creation of weighted connections between the nonlinearities, wherein for each augmented nonlinearity the output of the nonlinearity multiplied by a time-step corresponds to a number of spikes, and the spikes emitted from one or more augmented nonlinearities generates output from the neural network so as to perform a machine learning task of some kind.

We now formalize a class of augmented nonlinearities that result from quantizing any activation function through the application of temporal dithering. As mentioned, temporal dithering quantizes the activity level and then pushes the quantization error onto the next time-step—analogous to the concept of using error diffusion to dither a one-dimensional time-series (Floyd & Steinberg, 1976).

We define an augmented nonlinearity that interpolates an arbitrary activation function, f, between non-spiking and spiking regimes through choice of the parameter $\omega>0$, which we refer to as a "time-step," that is local to each particular nonlinearity or spiking neuron model. Four temporal dithering algorithms for creating augmented nonlinearities are discussed in what follows.

Let $x_t$ be the input to the nonlinear function at a discrete time-step, $t>0$, such that the ideal output (i.e., with unlimited precision) is $a_t=f(x_t)$. Algorithm 1 maintains one scalar state-variable across time, $v_t$, that tracks the total amount of quantization error that the neuron has accumulated over time. We recommend initializing $v_0 \sim U[0,1)$ independently for each neuron. The output of the neuron, $ã_t$, is determined by Algorithm 1.

Algorithms 2 and 3 are similar, but do not require maintaining an additional state-variable (i.e., the voltage) across time-steps. Instead, they sample random distributions to approximate this state-variable at each moment in time, thus distributing the quantization error over time (rather than tracking and pushing it onto the next time-step, as in Algorithm 1). Algorithm 4 specifies an alternative to Algorithm 1 that may be applied to any spiking neuron model instead of any nonlinear function.

Algorithm 1 (Dithered quantization):
  (a) Evaluate the nonlinear function.
  (b) Multiply by the time-step.
  (c) Add to the voltage.
  (d) Round down to the nearest integer to obtain the number of spikes.
  (e) Subtract the number of spikes from the voltage.
  (f) Divide the number of spikes by the time-step.
Algorithm 2 (Stochastic rounding):
  (a) Evaluate the nonlinear function.
  (b) Multiply by the time-step.
  (c) Compute the truncation error.
  (d) Generate a random sample from the U[0, 1) distribution.
  (e) If the truncation error is less than the random sample, then round down; otherwise, round up; to obtain the number of spikes.
  (f) Divide the number of spikes by the time-step.
Algorithm 3 (Poisson spiking):
  (a) Evaluate the nonlinear function.
  (b) Multiply by the time-step.
  (c) Generate a random sample from a Poisson distribution with the given expectation to obtain the number of spikes.
  (d) Divide the number of spikes by the time-step.
Algorithm 4 (Time dilation):
  (a) Progress the spiking neuron model forward by the time-step units of time.
  (b) Count the number of spikes emitted across this interval.
  (c) Divide the number of spikes by the time-step.

Each algorithm specifies a means of augmenting a particular processing node (nonlinear function or spiking neuron model), input to the network, or any linear combination thereof, in order to produce multi-bit spikes that are temporally sparse and directly lead to efficient implementation in digital hardware. Algorithm 1 requires an additional state-variable for each nonlinearity or signal being quantized, while Algorithms 2 and 3 require a random number generator (RNG) in hardware. Algorithm 4 specifies a means of handling any spiking neuron model in general by dilating its perspective on time.

The ideal activation, f, may be any conventional nonlinearity (e.g., linear, rectified linear, leaky rectified linear, thresholded rectified linear, parametric rectified linear, sigmoid, tanh, softmax, log softmax, max pool, polynomial, sine, gamma, soft sign, heaviside, swish, exponential linear, scaled exponential linear, gaussian error linear unit, etc.), or the time-averaged response curve corresponding to a biological neuron model (e.g., integrate-and-fire, leaky integrate-and-fire, quadratic integrate-and-fire, Izhikevich, Wilson, Mihalas-Niebur, etc.) including those with multiple internal state-variables (Koch, 2004). Adaptation may also be modelled by including a recurrent connection from $ã_t$ to $x_{t+1}$ (Voelker, 2019, section 5.2.1).

The function f can also be any linear combination (i.e., weighted sum) of other functions, neuron models, augmented nonlinearity, or inputs supplied by the network. As such, the methods described here extend to handle signals that have been 'decoded' using the Neural Engineering Framework (Eliasmith & Anderson, 2003), as well as inputs being supplied to the network, in order to communicate and encode signals from physical sensors, the user, a dataset, or similar.

Figure 11:
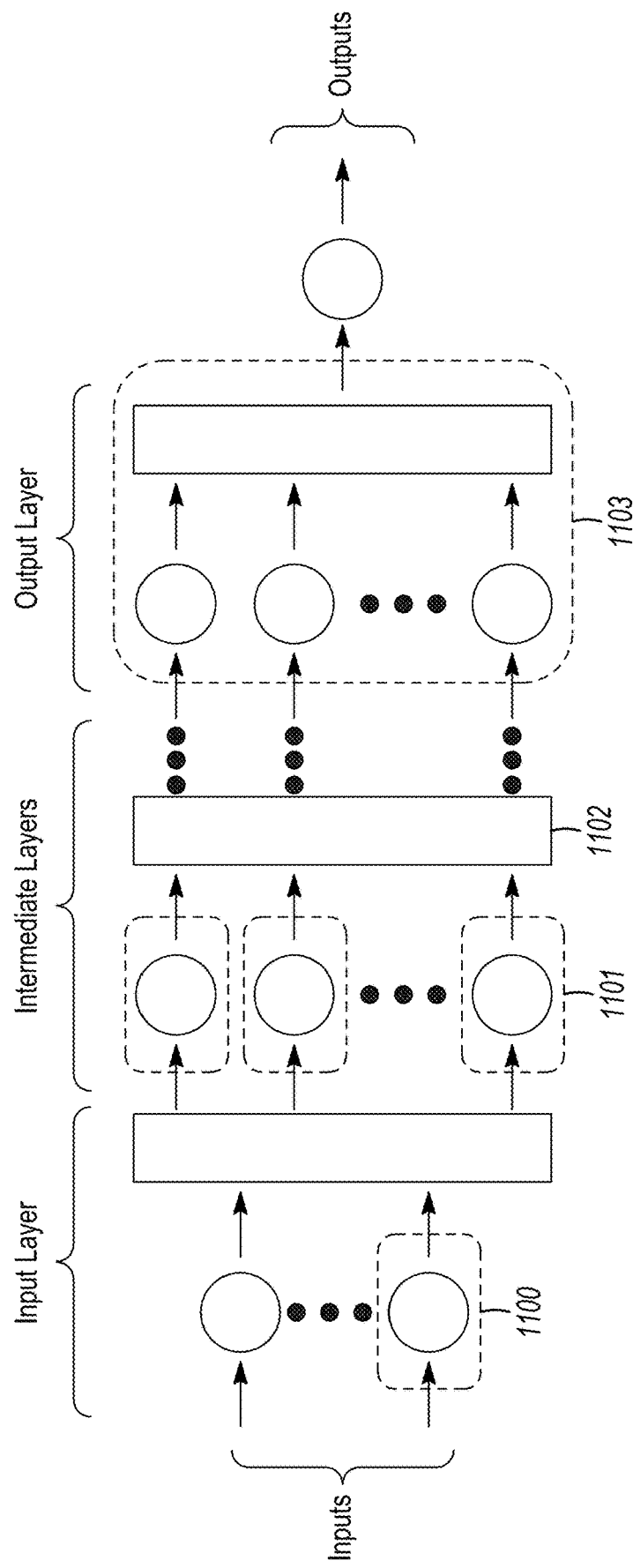
FIG. 11 illustrates a multi-layer feed-forward multi-bit spiking neural network, wherein one or more nonlinearities, spiking neuron models, inputs to the neural network, and linear combinations thereof, have been augmented using Algorithm 1, 2, 3, and 4.

In the example of FIG. 11, an input to the neural network (1100) is augmented in order to temporally sparsify some sensor data being transmitted as input to the neural network, a plurality of intermediate nonlinearities or spiking neuron models (1101) are augmented and the division by the time-step is fused with the connection weights applied to the output of each such augmented nonlinearity (1102) so that said augmented nonlinearities communicates an integer number of time-steps, and a linear combination of nonlinearities (1103) is augmented to encode the output of the neural network as a multi-bit spike train.

To help understand the relationship between the above temporal dithering algorithms and spiking neuron models, it is useful to interpret at as the number of spikes (k) that occur across a window of time normalized by the length of this window ($\omega$). Then $f(x_t) \times \omega$ represents the expected number of spikes across the window, and $v_t$ (in the case of Algorithm 1) tracks progress towards the next spike.

To the best of our knowledge, Algorithms 1, 2, 3, and 4 are novel in that they describe how to generalize neurons to emit multi-bit spike trains (i.e., a number of spikes other than 0 or 1 per time-step), and in doing so allow one to interpolate between ANNs and SNNs, which have traditionally been treated as two distinct operating regimes for neural networks. Furthermore, we describe several exemplary applications of these methods in digital hardware that lead to efficiency gains that are uniquely enabled by these four algorithms.

We note that Ando et al. (2018, Algorithm 1) is a special case of Algorithm 1 where $f(x)=\max(x, 0)$ is the rectified linear (ReLU) activation function, $\omega=1$, that is at most one spike occurs per time-step. Yousefzadeh et al. (2019a, Algorithm 1) extend this to represent changes in activation levels, and allow negative spikes. Still considering the ReLU activation, Algorithm 1 is again equivalent to the spiking integrate-and-fire (IF) neuron model, without a refractory period, a membrane voltage of $v_t$ normalized to [0,1), a firing rate of 1 Hz, and the ODE discretized to a time-step of $\omega$ s using zero-order hold (ZOH). The w parameter essentially generalizes the spiking model to allow multiple spikes per time-step, and the IF restriction is lifted to allow arbitrary activation functions (including leaky neurons, and those with negative spikes such as tanh).

Lastly, we note that a naive approach might involve truncating or rounding the result of the nonlinearity to some particular quantization level that represents the number of spikes. However, this will accumulate quantization errors over time, leading to systematic errors that may compound over time and do not scale away in the following manner. Thus, the novelty of the present innovation lies in the details of these four particular algorithms, and their resulting benefits in a hardware implementation that constrains the bit-widths of activities.

Scaling Properties

We now state several important properties of Algorithms 1, 2, 3, and 4. For convenience, we assume the range off is scaled such that $|f(\bullet)|\leq 1$ over the domain of valid inputs (this can also be achieved via clipping or saturation). In the case of Algorithm 4, we similarly assume that the underlying spiking neuron model is normalized such that it may only spike at most once across any time-step of length $\omega=1$ (this is discussed elsewhere in more detail).

(a) Zero-Mean Error

The expected quantization error is $E[\tilde{a}_t-a_t]=0$. In the case of Algorithm 1, this assumes that $v_{t-1}\sim U[0,1)$. In the case of Algorithm 4, this assumes that the inter-spike interval position (ISIP; Voelker, 2019; section 3.2.1) is uniformly distributed. For Algorithm 1, the total quantization error is bounded by $\|\Sigma t\in T \tilde{a}_t - a_t\|\leq \omega^{-1}$ across any consecutive slice of time-steps, T, without making any assumptions.

(b) Signal-to-noise (SNR) Ratio

Assuming zero-mean error, the signal-to-noise ratio (SNR; the ratio of the signal to its standard deviation) of at scales as $\Omega(\omega)$ for Algorithms 1, 2, and 4, and as $\Omega(\sqrt{\omega})$ for Algorithm 3.

(c) Synaptic Boosting

For Algorithms 1 and 4 filtering the output using a lowpass filter with a time-step of $\tau$ units of time boosts the SNR by a factor of $\Omega(x)$ relative to the filtered output. In the case of Algorithm 1, both statements assume that all $v_t$ are uniformly distributed. In the case of Algorithm 4, this assumes that the ISIPs are uniformly distributed. For Algorithms 2 and 3, filtering the output using a lowpass filter with a time-step of $\tau$ units of time boosts the SNR by a factor of $\Omega(\sqrt{\tau})$ relative to the filtered output.

(d) Bit-Widths

The number of bits required to represent $\tilde{a}_t$ in binary is at most $\lceil \log_2 (\omega+1) \rceil$ if f is non-negative (plus a sign bit if f can be negative).

(e) ANN Regime

As $\omega\to\infty$, $\tilde{a}_t\to a_t$, hence the activation function becomes equivalent to the ideal $f(\bullet)$.

(f) SNN Regime

When $\omega\leq 1$, the activation function becomes a conventional spiking neuron since it outputs either zero or a spike ($\omega^{-1}$) if f is non-negative (and optionally a negative spike if f is allowed to be negative).

(g) Temporal Sparsity

The number of spikes scale as $O(\omega)$.

(h) Gradient Computation

At any given time-step, we have $a_t=a_t+\eta$ where $\eta\sim T(-\omega^{-1}, \omega^{-1})$ is zero-mean noise with a symmetric triangular distribution. This justifies assigning a gradient of zero to $\eta$, and therefore reducing to the gradient of f. In the case of Algorithm 1, this assumes that $(v_{t-1}, v_t)\sim U[0,1)$ are independent random variables. In the case of Algorithm 4, this assumes that the ISIPs for times t-1 and t are both uniform and independently distributed.

To summarize, the choice of $\omega$ results in $O(\omega)$ spikes which requires $O(\log \omega)$ bits to represent, while achieving zero-mean error and an SNR of $\Omega(\omega)$ or $\Omega(\sqrt{\omega})$ relative to the ideal function. This SNR can also be boosted by a factor of $\Omega(\tau)$ or $\Omega(\sqrt{\tau})$, where $\tau$ is the time-constant of a synaptic filter applied to the multi-bit spike trains. The following table summarizes the scaling properties that are algorithm-dependent.

The effect of Algorithm 1 is depicted in FIG. 1 for various $\omega$. Specifically, the rectified linear (ReLU) function is provided the pixels of an MNIST digit as sequential input (one pixel per time-step), and the corresponding output of the augmented nonlinearity is plotted (101). The bit-width is varied as $\omega=2^{m-1}$; where $\omega$ is the maximum number of spikes per pixel. The value m=32 corresponds to the activities of a 32-bit ANN (102), whereas m=1 corresponds to those of an SNN (103).

| Algorithm | Unfiltered SNR | SNR Boost from Lowpass Filter | Assumptions |
|---|---|---|---|
| 1. Dithered quantization | $\Omega(\omega)$ | $\Omega(\tau)$ | Uniform voltages |
| 2. Stochastic rounding | $\Omega(\omega)$ | $\Omega(\sqrt{\tau})$ | Ideal RNG |
| 3. Poisson spiking | $\Omega(\sqrt{\omega})$ | $\Omega(\sqrt{\tau})$ | Ideal RNG |
| 4. Time dilation | $\Omega(\omega)$ | $\Omega(\tau)$ | Uniform ISIPs |

Figure 8:
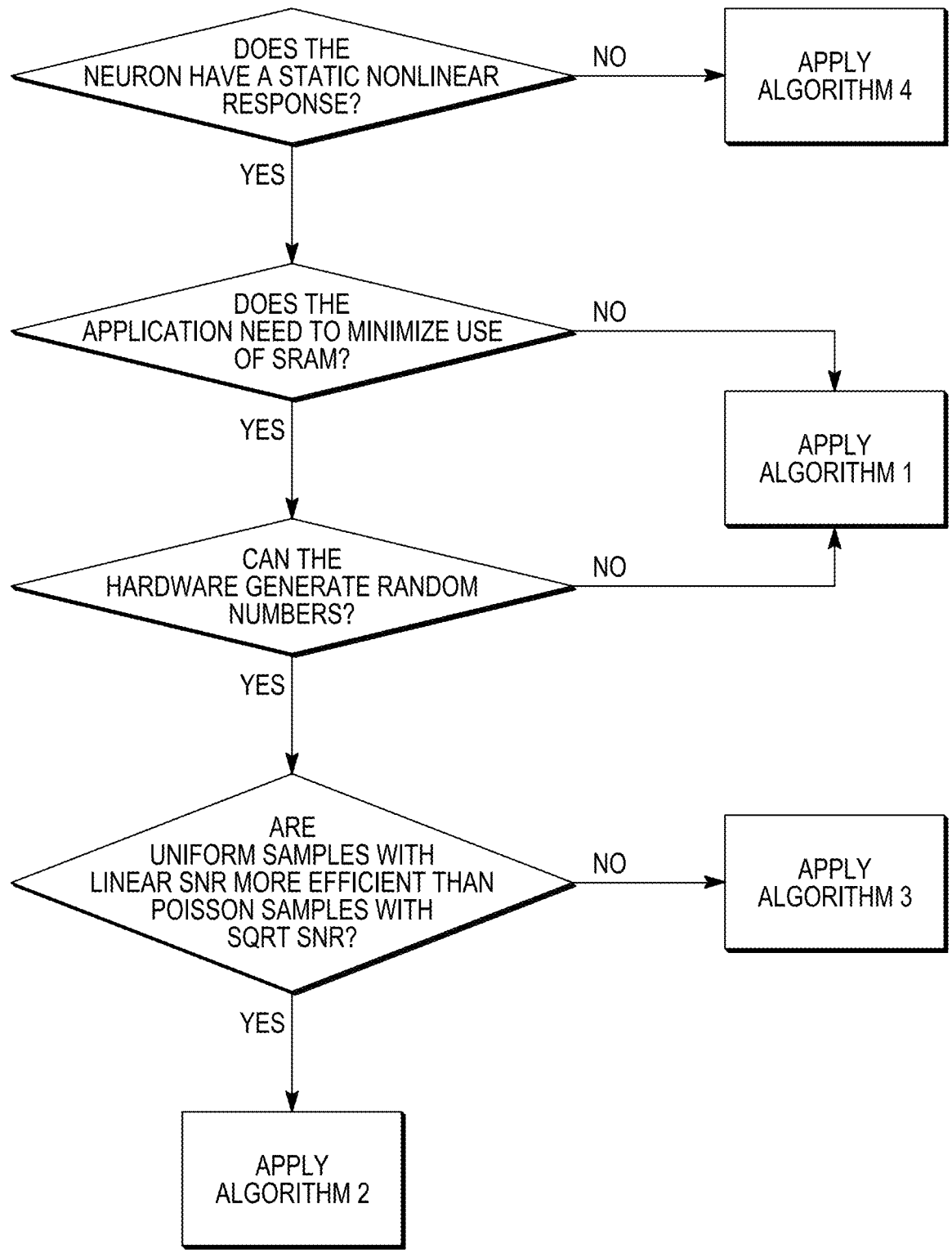
FIG. 8 illustrates a decision process for selecting between the four different multi-bit spiking algorithms.

FIG. 8 illustrates a decision heuristic for choosing between these algorithms on the basis of particular design constraints. If the available neuron models are constrained to not have static nonlinear responses, then the algorithm that uses time dilation is recommended (801). If static nonlinear responses are present and there is no need to minimize SRAM (802), or the hardware does not support random number generation (803), then the technique of dithered quantization is recommended. Alternatively, if there is a need to minimize SRAM usage and hardware-supported random number generation is available, then the key next question concerns whether uniform sampling provides more efficiency than Poisson sampling. If the former is true, then the technique of stochastic rounding is recommended (804), while if the latter is true, then the technique of Poisson spiking is recommended (805).

To train the network via backpropagation, the forward pass uses the quantized activation function to compute the true error for the current $\omega$, while the backward pass uses the gradient off (independently of ω). Therefore, the training method takes into account the temporal mechanisms of spike generation, but allows the gradient to skip over the sequence of operations that are responsible for keeping the total spike noise bounded by $\omega^{-1}$.

It will be apparent to one of skill in the art that other configurations, hardware etc may be used in any of the foregoing embodiments of the products, methods, and systems of this invention. It will be understood that the specification is illustrative of the present invention and that other embodiments suggest themselves to those skilled in the art. All references cited herein are incorporated by reference.

Converting Between ANN and SNN

Conceptually, we consider the variable ω from the above discussion as the maximum number of "spikes per step," or, more simply, as the signal-to-noise ratio (SNR) of the activation function. This is because it has less to do with changing the physical timing of the simulated mechanisms, and more to do with the precision at which spike rates are being "rounded" via spike counts. To reiterate, $SNR=\log_2(\omega+1)$, is the number of bits that each neuron transmits each step in its activation, with $\omega=1$ s corresponding to spiking mode (SNR of 1 bit), and $\omega=(2^{64}-1)$s corresponding to rate mode (SNR of 64 bits).

This suggests that, to convert from rate to spiking, we can interpolate by starting with a large ω, and then decrease it (on an exponential scale) towards 1. For example, we can choose a scheduling of $\omega \in (10^3, 10^2, 10^1, 10^0)$. At each step in the training, we are effectively giving the model one less digit (in base 10) in the activities, and training it to compensate. When no improvement is made to the validation loss for 40 consecutive epochs, we can move onto the next ω, and use the previous best model as the next starting point (with a new baseline for the validation loss). We find that ideally there is very little loss between the end of one phase and the start of another. If the difference is significant (e.g., 2× increase in error rates), this suggests that a smaller base should be used for the exponential scaling.

In general, to convert from an arbitrary rate-based neural network (ANN) to a spiking neural network (SNN), one can replace each activation function, f, with its corresponding dithered activation, and then make the SNR (i.e., bit-precision of the dithering) a variable being optimized. This can be optimized by adding a function of each ω to the loss function (i.e., as a regularization term), or by including it as a variable being optimized by some learning method (e.g., as a state variable being optimized by the backpropagation algorithm). For example, each epoch can reduce the SNR as a function of step size and learning rate. If no improvement to the validation loss is detected for X epochs, then update SNR←αSNR (0<α<1). Likewise, the adjustment of each time-step may take into account the desired number of spikes for each augmented nonlinearity, the desired precision (signal-to-noise ratio) for augmented each neuron, and the desired accuracy of the overall network. This may be repeated until training converges at some desired specification.

Figure 9:
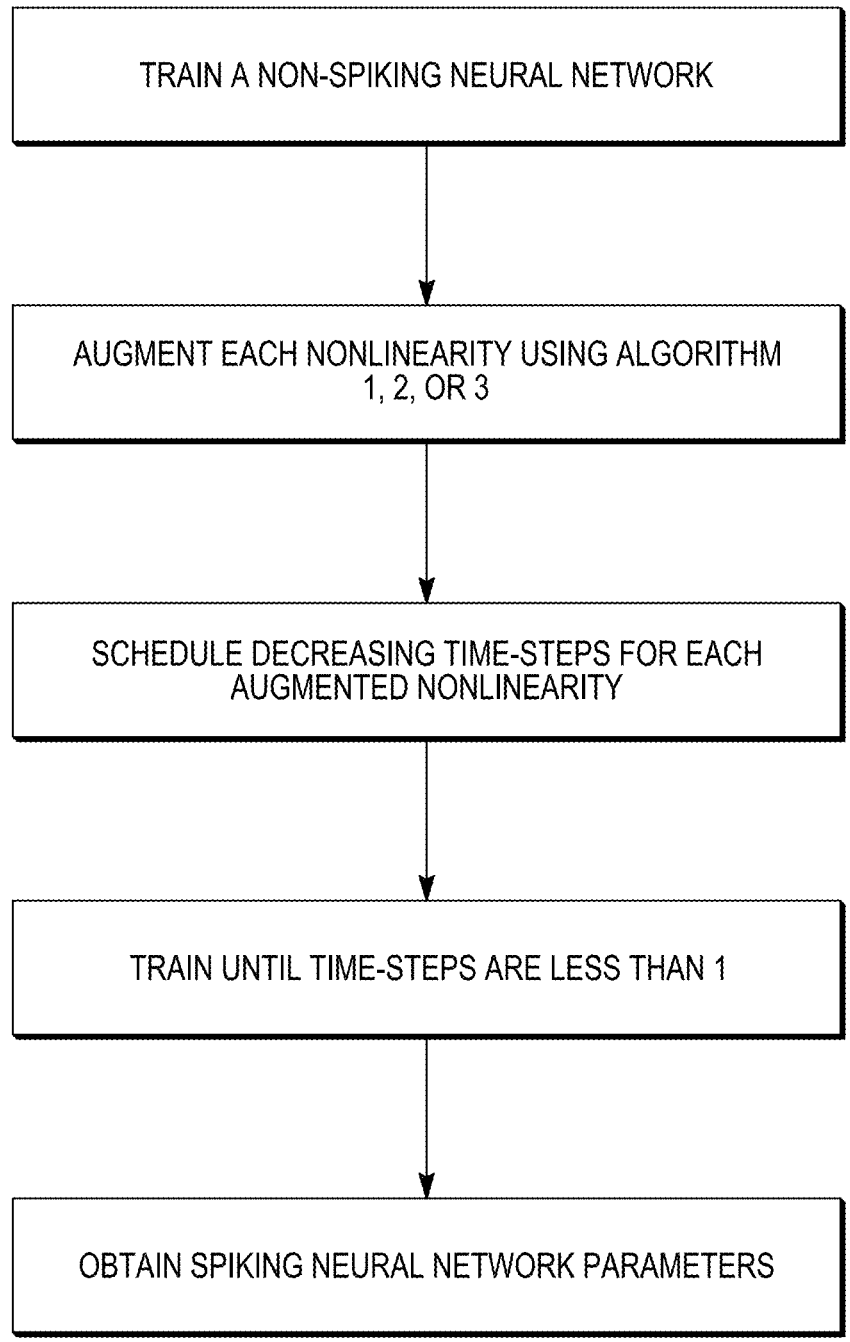
FIG. 9 illustrates a method of converting an ANN to an SNN using Algorithms 1, 2, and 3.

FIG. 9 provides a step-by-step breakdown of the process of converting an ANN into an SNN using the methods defined by the present invention. The first step involves training the ANN as per usual (901), after which the non-linearities in the network are augmented using one of algorithms 1, 2, and 3 (902). A schedule is then set for decreasing the timestep ω used by each augmented nonlinearity over the course of training (903), and the network is trained using this schedule until ω<1 (904). Upon completion of this training process, the network weights are saved for use in an SNN (905).

The learning method could be anything, for example an evolutionary learning algorithm to evolve ω for each augmented nonlinearity through evolutionary processes. As well, one can schedule the SNR using any possible scheduler (e.g., ExponentialDecay, InverseTimeDecay, PiecewiseConstantDecay, PolynomialDecay, etc.). Specifically, the SNR can follow any arbitrary schedule from epoch to epoch, until both training and SNR have reached desired levels.

In all cases, this enables an ANN to be simulated efficiently as an SNN at low power on special-purpose hardware, due to the benefits of temporal sparsification, including the simplification of MACs and a significant reduction in communication between nodes in the network, while obtaining similar levels of accuracy.

For spiking neuron models, we may use the spiking model (at the chosen SNR level of spikes per step) for the forward pass, but a custom gradient (a.k.a. "surrogate gradient"; Neftci et al., 2019) for the backward pass. By default, we recommend taking the gradient of f for the backward pass. In effect, the gradient is skipping over the quantization error, which amounts to zero-mean random noise as discussed in the scaling properties.

Lastly, we can also convert models in the opposite direction (i.e., from SNN to ANN), by increasing the value of ω in the same ways described above. This can be useful if we are starting by training an SNN from scratch, or have an SNN that has already been trained using some training method. This may result in a more accurate ANN, or a more efficient model on hardware that supports hybrid networks of spiking, non-spiking, and multi-bit spiking neurons.

Figure 10:
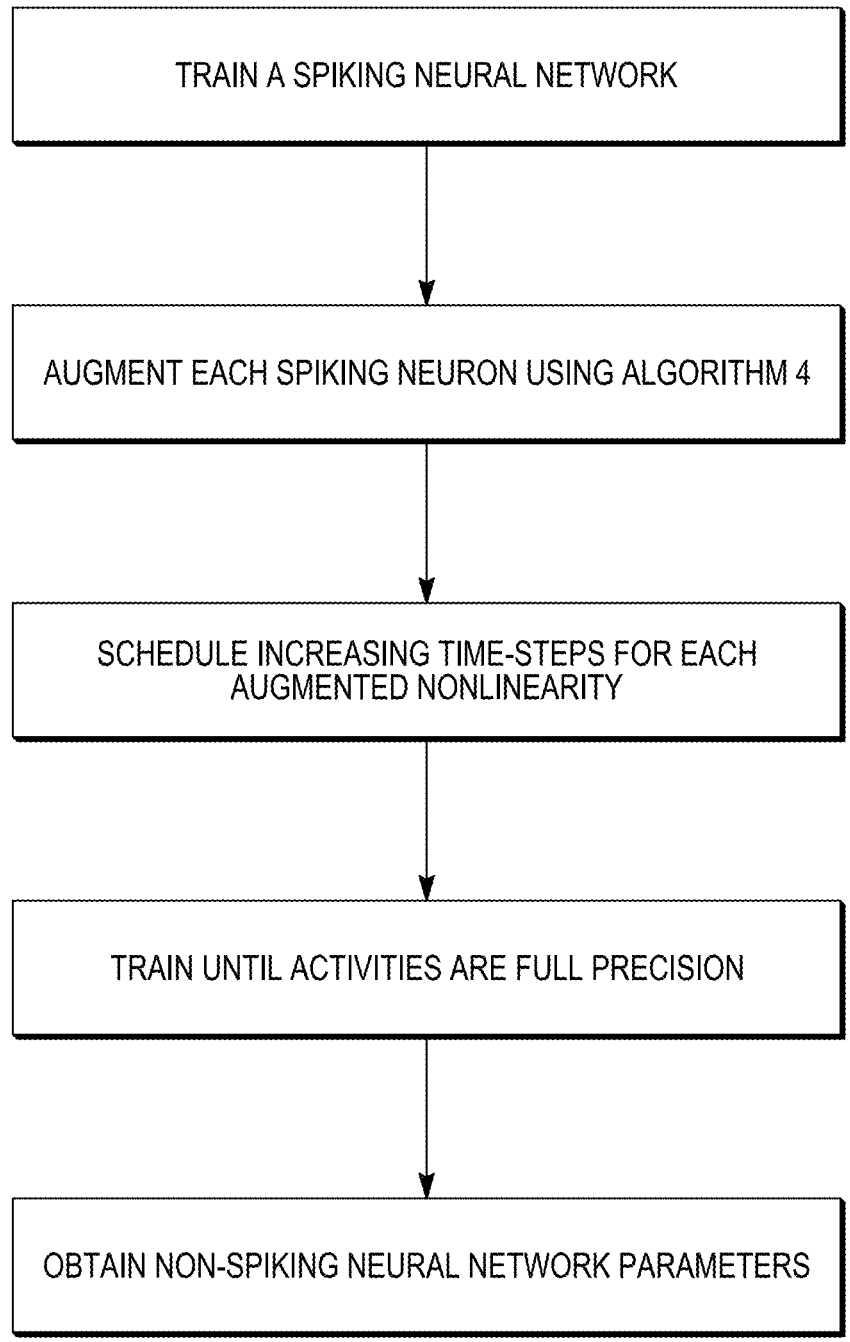
FIG. 10 illustrates a method of converting an SNN to an ANN using Algorithm 4.

FIG. 10. provides a step-by-step breakdown of this reversed process for converting an SNN into an ANN. The first step involves training an SNN using standard techniques (1001), after which the non-linearities in the network are augmented using algorithm 4 (1002). A schedule is then set for increasing the timestep ω used by each augmented non-linearity over the course of training (1003), and the network is trained using this schedule until all of the network activities are full precision (1004). Upon completion of this training process, the network weights are saved for use in ANN that will perform comparably to the original SNN (1005).

Exemplary Application—Training a Hybrid-Spiking LMU

As an example application of these methods we will use the Legendre Memory Unit (LMU; Voelker et al., 2019)—a new type of Recurrent Neural Network (RNN) that efficiently orthogonalizes the continuous-time history of some signal, $u(t) \in \mathbb{R}$, across a sliding window of length θ>0. The network is characterized by the following d coupled ODEs: $\theta \dot{m}(t)=Am(t)+Bu(t)$ where $m(t) \in \mathbb{R}^d$ is a d-dimensional memory vector, and (A, B) have a closed-form solution.

The key property of this dynamical system is that m represents sliding windows of u via the Legendre (1782) polynomials up to degree d−1. Thus, nonlinear functions of m correspond to functions across windows of length θ projected onto the Legendre basis.

We map these equations onto the state of an RNN, $m_t \in \mathbb{R}^d$, given some input $u_t \in \mathbb{R}$, indexed at discrete moments in time, $t \in \mathbb{N}$: $m_t = f_m(\bar{A}m_{t-1} + \bar{B}u_t)$, where $\bar{A}$ and $\bar{B}$ are the ZOH-discretized (A, B) matrices from Voelker et al., (2019) with a time-step of $\theta^{-1}$, expressed in discrete time-steps. In the ideal case, $f_m(\bullet)$ should be the identity function. For our hSNNs, we clip and then quantize $f_m(\bullet)$ using any one of Algorithms 1, 2, 3, and 4.

The LMU takes an input vector, $x_t$, and generates a hidden state. The hidden state, $h_t \in \mathbb{R}^n$, and memory vector, $m_t \in \mathbb{R}^d$, correspond to the activities of two neural populations that we will refer to as the hidden neurons and memory neurons, respectively. The hidden neurons mutually interact with the memory neurons in order to compute nonlinear functions across time, while dynamically writing to memory. The state is a function of the input, previous state, and current memory: $h_t = f_h(W_x x_t + W_h h_{t-1} + W_m m_t)$ where $f_h(\bullet)$ is some chosen nonlinearity—to be quantized using any one of Algorithms 1, 2, 3 and 4—and $W_x$, $W_h$, $W_m$ are learned weights. The input to the memory is: $u_t = e_x^T x_t + e_h^T h_{t-1} + e_m^T m_{t-1}$ where $e_x$, $e_h$, $e_m$ are learned vectors.

SNNs commonly apply a synapse model to the weighted summation of spike-trains. This filters the input to each neuron over time to reduce the amount of spike noise (Dayan & Abbott, 2001). The synapse is most commonly modelled as a lowpass filter, with some chosen time-constant $\tau$, whose effect is equivalent to replacing each spike with an exponentially decaying kernel, $h(t) = \tau^{-1} e^{-t/\tau} (t \geq 0)$.

By lowpass filtering the activities, the SNR of Algorithm 1 is effectively boosted by a factor of $\Omega(\tau)$ relative to the filtered ideal, since the filtered error becomes a weighted time-average of the quantization errors. Thus, we lowpass filter the inputs into both $f_m(\bullet)$ and $f_h(\bullet)$. To account for the temporal dynamics introduced by the application of a lowpass filter, Voelker & Eliasmith (2018, equation matrices, 4.7) provide methods for substituting the correct connection weights.

To interpolate between ANN and SNN regimes, we set $\omega$ differently from one training epoch to the next, in an analogous manner to scheduling learning rates. Since $\omega$ is exponential in bit-precision, we vary $\omega$ on a logarithmic scale across the interval $[\omega_h, \omega_l]$, where $\omega_h$ is set to achieve rapid convergence during the initial stages of training, and $\omega_l$ depends on the hardware and application. Once $\omega = \omega_l$, training is continued until validation error stops improving, and only the model with the lowest validation loss during this fine-tuning phase is saved.

We found that this method of scheduling $\omega$ typically results in faster convergence rates versus the alternative of starting $\omega$ at its final value. We also observe that the SNR of $f_m(\bullet)$ is far more critical than the SNR of $f_h(\bullet)$, and thus schedule the two differently (explained below).

To facilitate comparison between the "Long Short-Term Memory Spiking Neural Network" (LSNN) from Bellec et al. (2018), and both spiking and non-spiking LMUs (Voelker et al., 2019), we consider the sequential MNIST (sMNIST) task and its permuted variant (psMNIST; Le et al., 2015). For sMNIST, the pixels are supplied sequentially in a time-series of length 282. Thus, the network must maintain a memory of the relevant features while simultaneously computing across them in time. For psMNIST, all of the sequences are also permuted by an unknown fixed permutation matrix, which distorts the temporal structure in the sequences and significantly increases the difficulty of the task. In either case, the network outputs a classification at the end of each input sequence. For the output classification, we take the argmax over a dense layer with 10 units, with incoming weights initialized using the Xavier uniform distribution (Glorot & Bengio, 2010). The network is trained using the categorical cross entropy loss function (fused with softmax).

All of our LMU networks are built in Nengo (Bekolay et al., 2014) and trained using Nengo-DL (Rasmussen, 2019). The 50 k "lost MNIST digits" (Yadav & Bottou, 2019) are used as validation data to select the best model. All sequences are normalized to $[-1,1]$ via fixed linear transformation $(2x/255-1)$. We use a minibatch size of 500, and the Adam optimizer (Kingma & Ba, 2014) with all of the default hyperparameters ($\alpha = 0.001$, $\beta_1 = 0.9$, $\beta_2 = 0.999$).

To quantize the hidden activations, we use the leaky integrate-and-fire (LIF) neuron model with a refractory period of 1 time-step and a leak of 10 time-steps (corresponding to Nengo's defaults given a time-step of 2 ms), such that its response curve is normalized to $0 \leq f_h(\bullet) < 1$. The input to each LIF neuron is biased such that $f(x) = 0 \Leftrightarrow x \leq 0$, and scaled such that $f(1) = e/(1+e)$, as discussed elsewhere. During training, the $\omega$ for $f_h(\bullet)$ is interpolated across $[16,1]$. Thus, the hidden neurons in the fully trained networks are conventional (1-bit) spiking neurons.

To quantize the memory activations, we use $f_m(x) = x \cdot \text{clip}(-1, +1)$, which is analogous to using IF neurons that can generate both positive and negative spikes. To maintain accuracy, the $\omega$ for $f_m(\bullet)$ is interpolated across $[32, 2]$ for sMNIST, and across $[4080, 255]$ for psMNIST. We provide details regarding the effect of these choices on the number of possible activity levels for the memory neurons, and discuss the impact this has on MAC operations as well as the consequences for energy-efficient neural networks.

The synaptic lowpass filters have a time-constant of 200 time-steps for the activities projecting into $f_m(\bullet)$ and 10 time-steps for the activities projecting into $f_h(\bullet)$. The output layer also uses a 10 time-step lowpass filter. We did not experiment with any other choice of time-constants.

All weights are initialized to zero, except: $e_x$ is initialized to 1, $W_m$ is initialized using the Xavier normal distribution (Glorot & Bengio, 2010), and the LMU's (A, B) matrices are initialized as described previously and left untrained. L2-regularization ($\lambda = 0.01$) is added to the output vector. We did not experiment with batch normalization, layer normalization, dropout, or any other regularization techniques.

Time-Normalization

Nonlinearities and spiking neuron models and synapses may be "time-normalized" so that a time-step of one unit corresponds to at most one spike per time-step. More generally, so that a time-step of $\omega$ corresponds to at most $\omega$ spikes per time-step. Since the spike count is divided by $\omega$, and the output of the neuron model can take on ($\omega + 1$) distinct levels, it is interpretable as an instantaneous firing rate with $\log_2(\omega + 1)$ bits of precision, as discussed elsewhere.

To demonstrate, we time-normalize the leaky integrate-and-fire (LIF) spiking neuron model. This is accomplished by scaling all of its time-constants by the same factor (e.g., 2 ms given LIF's default refractory period of 2 ms, which causes it to saturate at 500 Hz). This does not change their behaviour; this only normalizes the axis of time by a 500× factor, such that one simulation step with $\omega = 1$ s corresponds to an "effective" time-step of 2 ms. In rate mode, this is equivalent to setting amplitude=2 ms.

To time-normalize the lowpass synapse dynamics, we may "pre-discretize" them using ZOH with time-constants expressed in units of discrete steps (e.g., $\tau/\omega = 20$ ms/2 ms=10 steps, for the hidden unit synapses) before passing them to Nengo. This makes their computations independent of the time-step passed to the builder.

This is quite useful for two main reasons: (1) neuron model activation functions are now normalized to a range of $[0, 1)$, making them somewhat compatible with standard weight initialization schemes in Keras and TensorFlow, and comparable to existing activation functions that have the same range, such as sigmoid; and (2) $\omega = (2^k - 1)$s is equivalent to running the network in rate mode with k-bit activities (assuming no catastrophic cancellation), while ω=1 s is equivalent to running the network in spiking mode, and thus we can naturally interpolate between the two regimes without even changing the model.

Next, we also normalize the response curve to have its threshold at x=0 and a response of r<1 at x=1. This normalization establishes an initial dynamic range that is comparable to that of more standard activation functions. In particular, we set r=sigmoid(1) ~0.73, and suspect that any nearby values of r should also work well. This is achieved by setting the bias to 1, and then solving for the gain from r with the standard max_rates_intercepts math in Nengo core.

Figure 4:
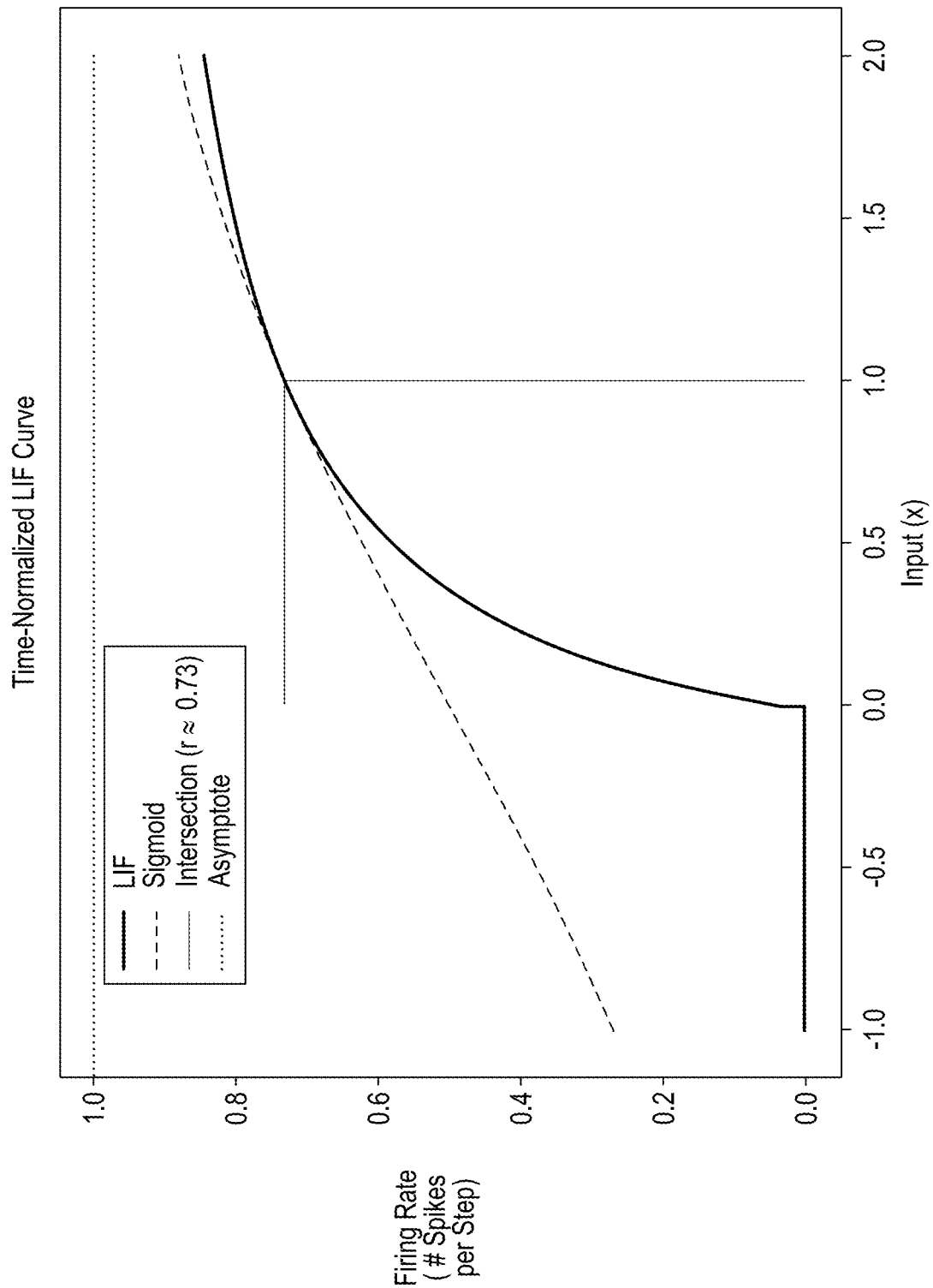
FIG. 4 illustrates a time-normalized LIF curve, normalized such that $f(1)=r$ with an asymptote of $\lim_{x\to\infty} f(x)=1$. The shape remains the same as the standard LIF curve. We recommend $r=\text{sigmoid}(1)=e/(1+e)$.

This time-normalization is summarized by FIG. 4. The time-normalized LIF curve (401) is shown together with the standard sigmoid nonlinearity (402) by plotting the response curve of input (403) against the number of spikes per time-step (404) when ω=1. These two curves intersect at f(1)=sigmoid(1) (405). The gradients are approximately the same at 1, and become equal as the membrane time-constant on the LIF neuron increases. Both curves asymptote at 1 (406) as x approaches infinity.

Time-Dilation

To efficiently apply Algorithm 4 to some spiking neuron model, we must effectively "fast-forward" the model in time by ω units of time and count all of its spikes. We demonstrate how to do this for the LIF spiking neuron model. This model has the parameters: tau_rc, which controls the membrane time-constant; tau_ref, which controls the length of its refractory period; min_voltage, which places a bound on the minimum possible voltage; and the amplitude, which scales the integral of the resulting spike trains.

The following code is based on the LIF model in Nengo v3.0.0, and consists of NumPy statements that have been annotated to describe the computations. In short, zero-order hold (ZOH) is used in combination with the handling of edge cases depending on how the refractory period overlaps the boundaries of the time-step. This allows us to do the fast-forwarding with O(1) time and O(1) memory, per neuron, on digital hardware.

The parameter ω is the time-step local to the neuron model (i.e., the amount of time that we are fast-forwarding), the variable J represents the input current to the model, the output of the model is a variable named spiked, and the state of the neuron model is its voltage and remaining refractory time.

lif_model(ω, J, spiked, voltage, refractory_time):

(i) reduce all refractory times by ω:

refractory_time−=ω

(ii) compute effective ω for each neuron, based on remaining time. note that refractory times that have completed midway into this timestep will be given a partial timestep, and moreover these will be subtracted to zero at the next timestep (or reset by a spike):

delta_*t*=(ω−refractory_time)·clip(0,ω)

(iii) update voltage using zero-order hold (ZOH) solution to the leaky integrate dynamics, v(t)=v(0)+(J−v(0))*(1−exp(−t/tau)), by assuming J is held constant across the time-step:

voltage+=(voltage−*J*)*$np$·expm1(−delta_*t*/tau_*rc*)

(iv) determine which neurons spiked:

spiked_mask=voltage>1

(v) set v(0)=1 and solve for t (using the ZOH equation above) to get the time that has elapsed between the time of spike up until the end of the time-step. in other words, this gives the time remaining after the first spike, for each neuron:

*J*_spiked=*J*[spiked_mask]

inv_*J*=1/(*J*_spiked−1)

*t*_left=−tau_*rc*\**np*·log 1*p*((1−voltage[spiked_mask])\*inv_*J*)

(vi) determine the interspike interval (1/rate) for the neurons that spiked, based on LIFRate equation:

*isi*=tau_ref+tau_*rc*\**np*·log 1*p*(inv_*J*)

(vii) compute the number of extra spikes that have also occurred during this time-step, given the remaining time (not including the first spike):

*n*_extra=*np*·floor(*t*_left/*isi*)

(viii) update t_left to account for any extra spikes, and the final refractory period. if it becomes negative this implies the refractory period has extended into the next time-step (by −t_left seconds) otherwise a positive value indicates there is still time remaining:

*t*_left−=*isi*\**n*_extra+tau_ref (ix) use any positive time remaining to update the voltage (from zero) via the ZOH equation once again. note that if there is no positive time remaining then the voltage will become 0:

voltage[spiked_mask]=−*J*_spiked*$np$·expm1(−*t*_left·clip(min=0)/tau_*rc*)

(x) rectify negative voltages:

voltage[voltage<min_voltage]=min_voltage (xi) additively output amplitude/ω for each spike, including the first:

spiked[:]=0 spiked[spiked_mask]=(1+*n*_extra)*amplitude/ω

(xii) set refractory time to a full time-step (since ω will be subtracted away on the next call to this function) plus the time that tau_ref extended into the next time-step (−t_left for negative t_left):

refractory_time[spiked_mask]=ω−*t*_left·clip(max=0)

We find that this neuron model correctly computes the total number of spikes as a LIF spiking neuron model that has been progressed by the same total amount of time.

For more sophisticated neuron models that do not permit analytic solutions such as from zero-order hold, one can employ the use of ordinary differential equation (ODE) solvers such as Runge-Kutta methods to fast-forward the dynamical system in time.

Exemplary Application—Sequential MNIST

Performance of RNNs on the sequential MNIST task.

| Network | Trainable | Weights | Non-linearities | State | Levels | Steps | Test (%) |
|---|---|---|---|---|---|---|---|
| LSTM | 67850 | 67850 | 384 sigmoid, 128 tanh | 256 | $2^{32}$ | 784 | 98.5 |
| LMU | 34571 | 51083 | 128 sigmoid | 256 | $2^{32}$ | 784 | 98.26 |
| hsLMU | 34571 | 51083 | 128 LIF, 128 IF | 522 | 2-5 | 784 | 97.26 |

| Net-work | Train-able | Weights | Non-linearities | State | Lev-els | Steps | Test (%) |
|---|---|---|---|---|---|---|---|
| LSNN | 68210 | 8185 | 120 LIF, 100 adaptive | ≥550 | 2 | 1680 | 96.4 |

The LSTM and LSNN results shown in the above table have been extended from Bellec et al. (2018, Tables S1 and S2). We note that these two results (98.5% and 96.4%) represent the best test accuracy among 12 separately trained models, without any validation. The mean test performance across the same 12 runs are 79.8% and 93.8% for the LSTM and LSNN, respectively.

The LSTM consists of only 128 "units," but is computationally and energetically intensive since it maintains a 256-dimensional vector of 32-bit activities that are multiplied with over 67 k weights. The LSNN improves this in two important ways. First, the activities of its 220 neurons are all one bit (i.e., spikes). Second, the number of parameters are pruned down to just over 8 k weights. Thus, each time-step consists of at most 8 k synaptic operations that simply add a weight to the synaptic state of each neuron, followed by local updates to each synapse and neuron model.

However, the LSNN suffers from half the throughput (each input pixel is presented for two time-steps rather than one), a latency of 112 additional time-steps to accumulate the classification after the image has been presented (resulting in a total of 2×282+112=1680 steps), and an absolute 2.1% decrease in test accuracy. In addition, at least 550 state-variables (220 membrane voltages, 100 adaptive thresholds, 220 lowpass filter states, 10 output filters states, plus state for an optional delay buffer attached to each synapse) are required to maintain memory between time-steps. The authors state that the input to the LSNN is preprocessed using 80 more neurons that fire whenever the pixel crosses over a fixed value associated with each neuron, to obtain "some-what better performance."

The non-spiking LMU is the Nengo implementation from Voelker et al. (2019) with n=128 and d=128, the sigmoid activation chosen for $f_h(\bullet)$, and a trainable bias vector added to the hidden neurons. This network obtains a test accuracy of 98.26%, while using only 128 nonlinearities, and training nearly half as many weights as the LSTM or LSNN. However, the MAC operations are still a bottleneck, since each time-step requires multiplying a 256-dimensional vector of 32-bit activities with approximately 51 k weights vector.

To reduce the volume of traffic being transmitted and the number of MAC operations in hardware, we quantize the activity functions and filter their inputs. We refer to this as a "hybrid-spiking LMU" (hsLMU) since the hidden neurons are conventional (i.e., one-bit) spiking LIF neurons, but the memory neurons can assume a multitude of distinct activation levels by generating multiple spikes per time-step.

Figure 2:
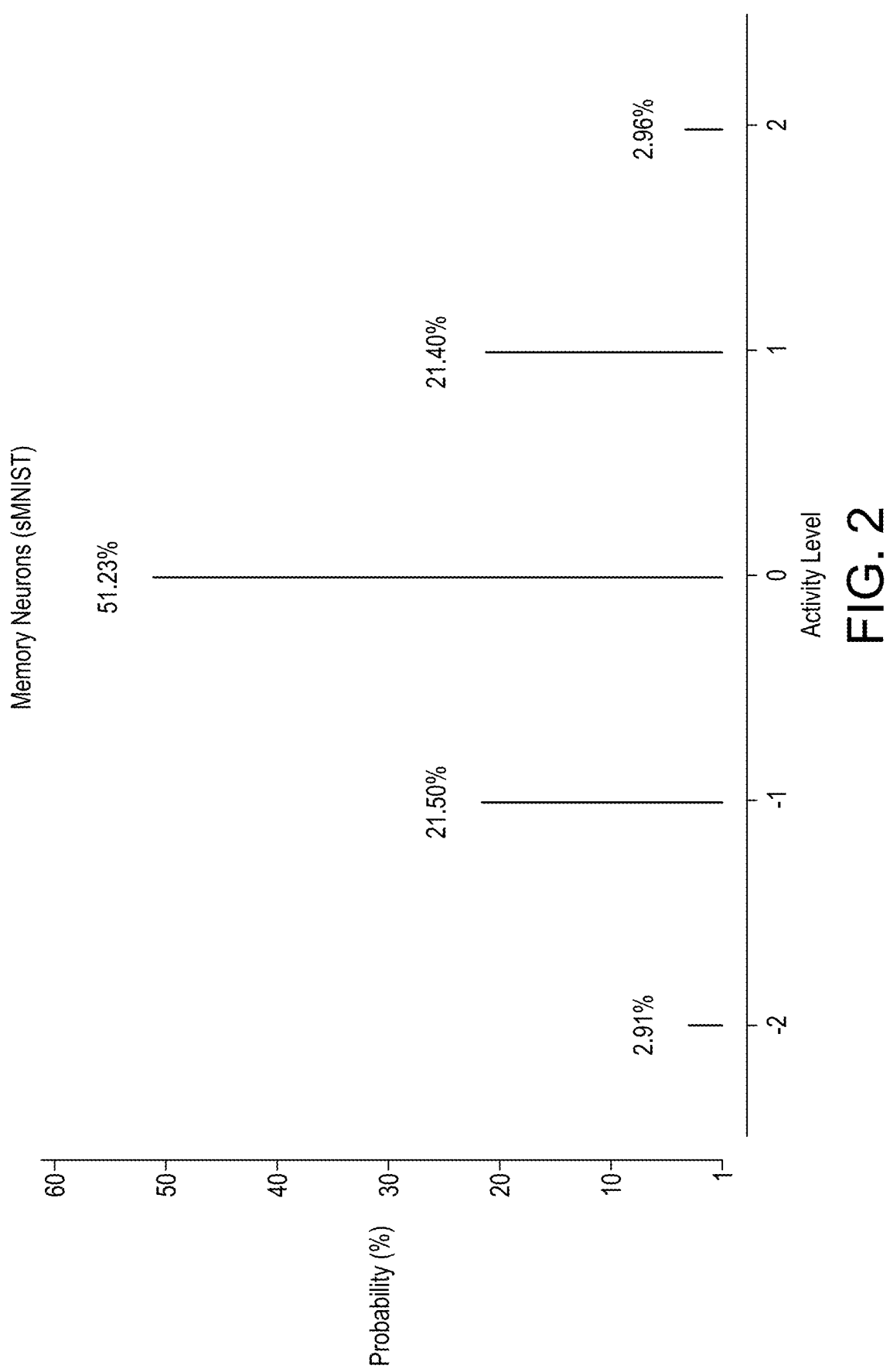
FIG. 2 illustrates the distribution of activity levels for the memory neurons, $f_m(\bullet)$, in the hsLMU network solving the sMNIST task.

By training until ω=2 for $f_m(\bullet)$, each memory neuron can spike at 5 different activity levels (see FIG. 2). We remark that the multi-bit spike distribution (201) is symmetric about zero (202), and "prefers" the zero state 51.23% (203) of the time, since equation 1 has exactly one stable point: m(t)=0. As well, the hidden neurons spike only 36.05% of the time. As a result, the majority of weights are not needed on any given time-step. Furthermore, when a weight is accessed, it is simply added for the hidden activities, or multiplied by an element of {−2,−1,+1,+2} for the memory activities.

These performance benefits come at the cost of a 1% decrease in test accuracy, and additional state and computation—local to each neuron—to implement the lowpass filters and Algorithm 1. Specifically, this hsLMU requires 522 state-variables (256 membrane voltages, 256 lowpass filters, and 10 output filters). This network outperforms the LSNN, does not sacrifice throughput nor latency, and does not require special preprocessing of the input data.

We also tried training until ω=1 for $f_m(\bullet)$, constraining the IF neurons to spike at most once per step. This resulted in a test accuracy of 94.76%. Therefore, for this task, it is very beneficial to relax this constraint. Even just changing the clip to (−2, 2) results in a large accuracy boost, and is equivalent to saying the IF memory neurons can spike at most once every ms (i.e., at most twice per 2 ms time-step, which is consistent with the LSNN model).

Exemplary Application—Permuted Sequential MNIST

Performance of RNNs on the permuted sequential MNIST task.

| Net-work | Train-able | Weights | Non-linearities | Bit-width | Significant Bits | Test (%) |
|---|---|---|---|---|---|---|
| LSTM | 163610 | 163610 | 600 sigmoid, 200 tanh | 32 | N/A | 89.86 |
| LMU | 102027 | 167819 | 212 tanh | 32 | N/A | 97.15 |
| hsLMU | 102239 | 168031 | 212 LIF, 256 IF | 3.74 | 1.26 | 96.83 |

Several RNN models have been used to solve the psMNIST task (Chandar et al., 2019), with the highest accuracy of 97.15% being achieved by an LMU (Voelker et al., 2019) of size n=212, d=256. The LMU result, and the LSTM result from Chandar et al. (2019), are reproduced in the above table.

We consider the same network as before, scaled up to n=212 and d=256. Consistent with the previous hsLMU, the hidden neurons are spiking LIF, and the memory neurons are multi-bit IF neurons that can generate multiple positive or negative spikes per step. In particular, by training until ω=255 for $fm(\bullet)$ each memory neuron can spike between −24 and +26 times (inclusive) per step for a total of 50 distinct activity levels, which requires 6 bits to represent.

Figure 3:
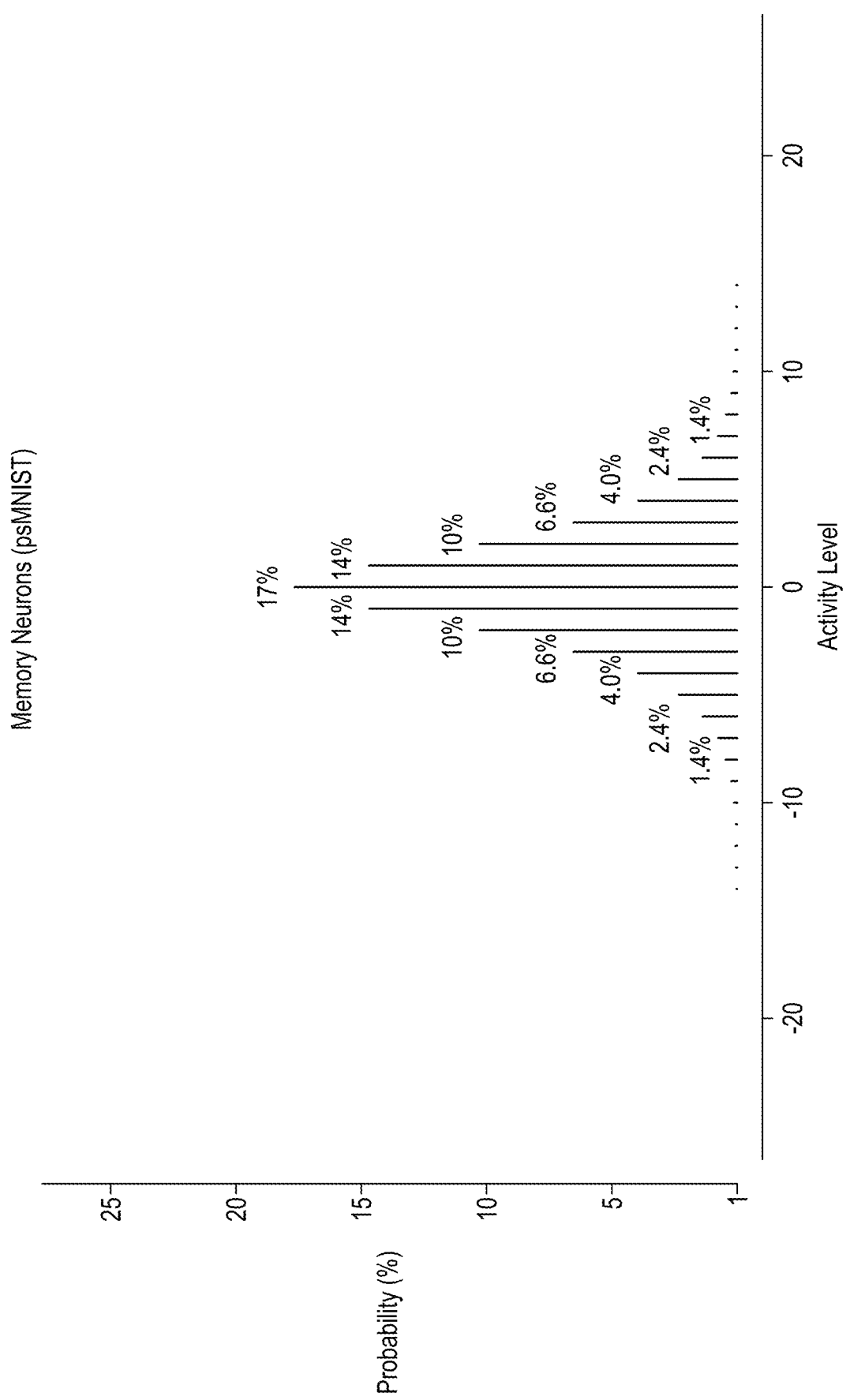
FIG. 3 illustrates the distribution of activity levels for the memory neurons, $f_m(\bullet)$, in the hsLMU network solving the psMNIST task (as opposed to the sMNIST task).

As shown in FIG. 3, the distribution of memory activities (301) are symmetric about zero (302), and 17.71% (303) of the time the neurons are silent. The 1-bit hidden neurons spike 40.24% of the time. We note that the hsLMU uses 212 more parameters than the LMU from Voelker et al. (2019), as the latter does not include a bias on the hidden nonlinearities.

To quantify the performance benefits of low-precision activities, we propose the following two metrics. The first is the worst-case number of bits required to communicate the activity of each neuron, in this case 1 for the hidden neurons and 6 for the memory neurons, which has a weighted average of approximately 3.74 bits. The second is the number of bits that are significant (i.e., after removing all of the trailing zero bits, and including a sign bit for negative activities), which has a weighted average of approximately 1.26 bits.

The "bit-width" metric is useful for determining the worst-case volume of spike traffic on hardware where the size of the activity vectors are user-configurable (Furber et al., 2014; Liu et al., 2018), and for hardware where the quantization of activities leads to quadratic improvements in silicon area and energy requirements (McKinstry et al., 2018). The "significant bits" metric reflects how many significant bits are multiplied with each weight, which is important for hardware where bit-flips in the datapath correlate with energy costs (Li et al., 2019), or hardware that is optimized for integer operands close to zero. For instance, a value of 1 for this metric would imply that each MAC, on average, only needs to accumulate its weight (i.e., no multiply is required). These performance benefits come at the cost of a 0.32% decrease in test accuracy, which still outperforms all other RNNs considered by Chandar et al. (2019); Voelker et al. (2019) apart from the LMU, while using comparable resources and parameter counts.

Interestingly, for the sMNIST network, the bit-width metric is exactly 2 (as there are an equal number of hidden (1-bit) and memory (3-bit) neurons). The significant bits for that network is 0.58, because a majority of the neurons are inactive on each time step.

Exemplary Application—Dithered Spiking LIF Neurons

Figure 5:
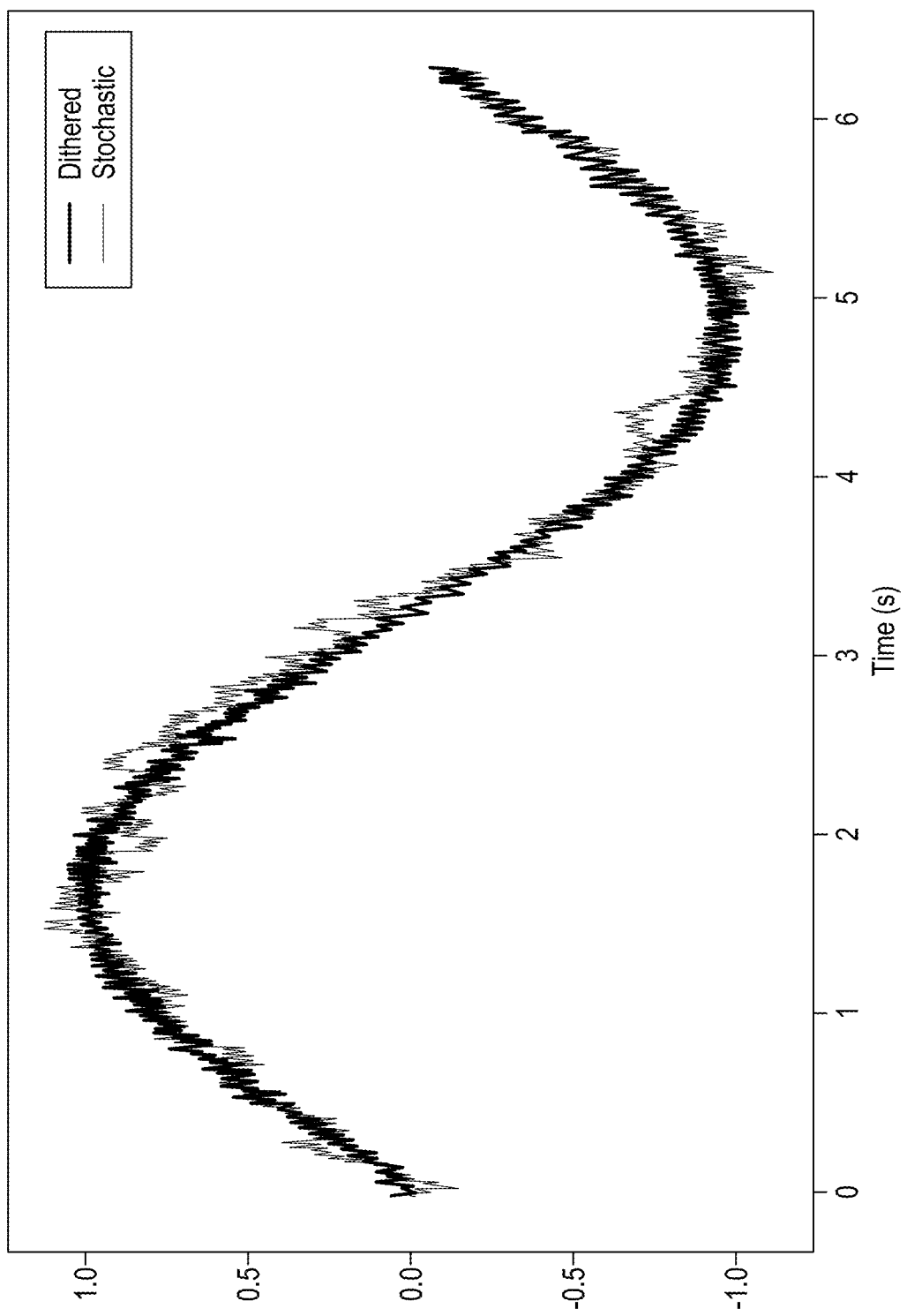
FIG. 5 illustrates a Neural Engineering Framework (NEF) communication channel using 100 LIF neurons with max_rates$\in$U[10, 20) and a lowpass of $\tau=100$ ms. Dithered spiking (Algorithm 1) is far more accurate than stochastic spiking (Algorithm 2), since a synaptic filter is employed to boost the SNR.

FIG. 5 illustrates the effect of taking an NEF communication channel built with Nengo and applying either Algorithm 1 (501; Dithered) or Algorithm 2 (502; Stochastic) to the neurons decoding a filtered sinusoidal function over time. We see clear benefits in using Algorithm 1 to diffuse quantization error over time, due to the use of a synaptic lowpass filter.

To quantify these benefits we implemented a two-dimensional controlled oscillator using the methods of Voelker et al. (2018) and found that applying Algorithm 1 to the conventional LIF spiking neuron model resulted in a 10-20% improvement in the similarity between the frequency of the ideal oscillations and the frequency of the decoded oscillations.

Figure 6A:
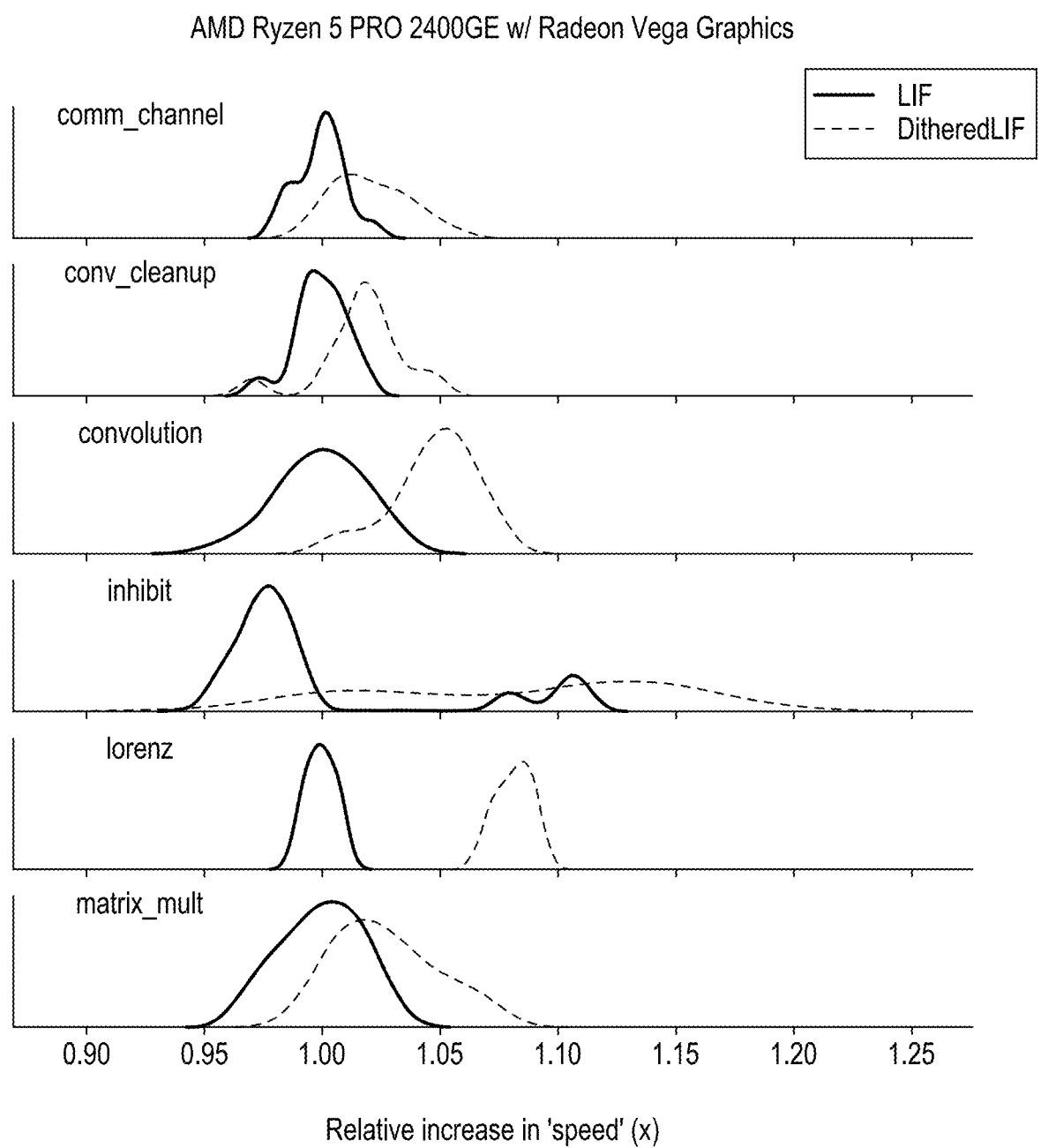
FIGS. 6A and 6B illustrate the benchmark results for Nengo's suite of benchmarks. The use of Algorithm 1 (Dithered LIF) results in an overall speedup of 5-10% on average, compared to the conventional method of simulating the leaky integrate-and-fire dynamics over time (LIF). The different subgraphs correspond to different SNN test conditions involving specific kinds of network functionality, and show the probability distribution over a set of trials.
Figure 6B:
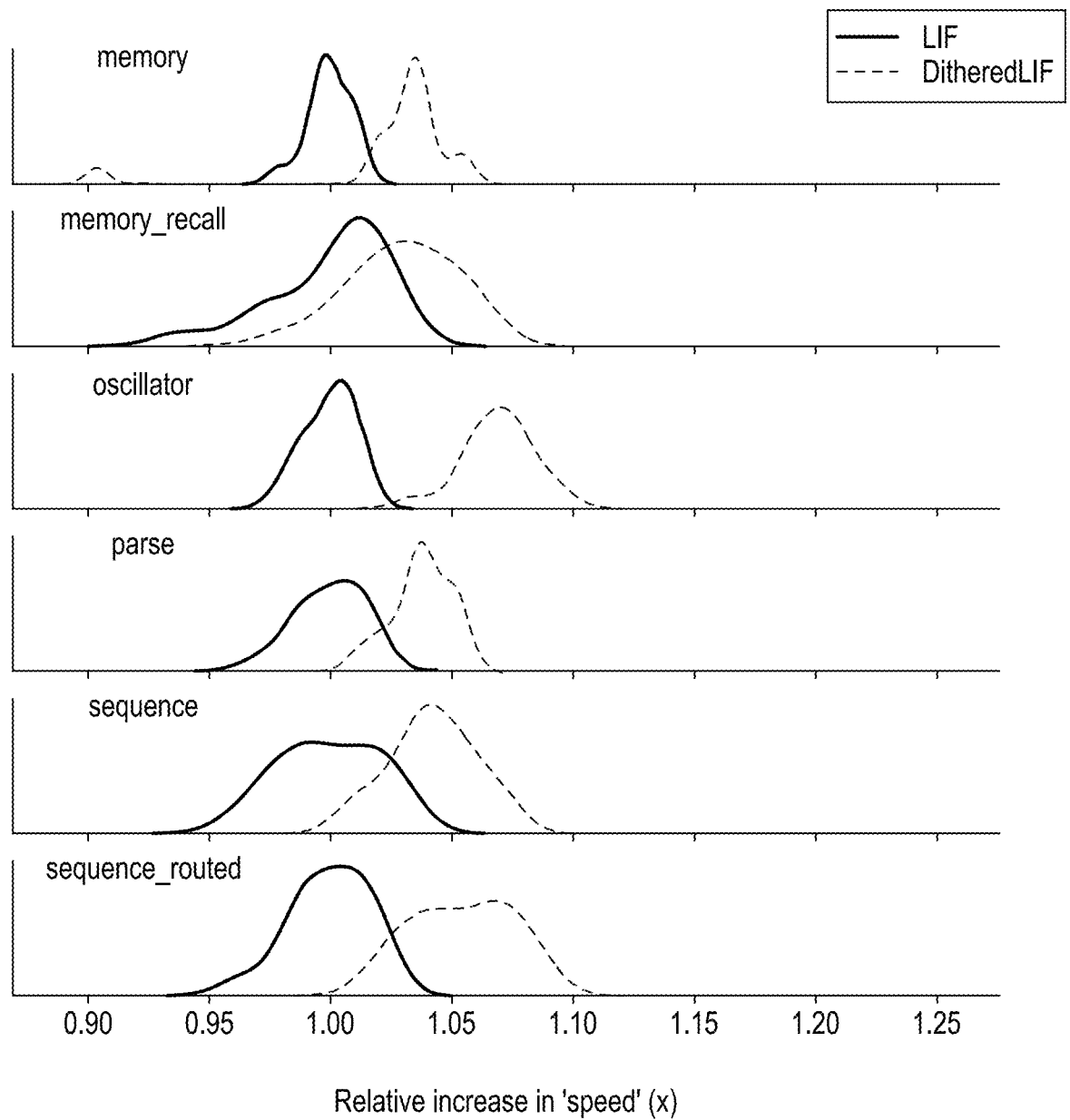

Furthermore, there are efficiency benefits to using Algorithm 1 over a conventional LIF spiking neuron in digital hardware, since the latter requires simulating ODEs over time. To quantify these benefits, we ran a suite of Nengo benchmarks with all instances of spiking LIF neurons augmented using Algorithm 1. The results are illustrated in FIG. 6, which reveals an average speedup of 5-10% in the inference time for each model using dithered LIF neurons (601) in comparison to regular LIF neurons (602).

Exemplary Application—Exploiting Sparse Signals in Digital Hardware

In addition to the benefits discussed thus far, there are benefits to exploiting the sparsity of the signals introduced by Algorithms 1, 2, 3 and 4 at low values of $\omega$. Specifically, signals can be transmitted more efficiently by way of a reduction in the number of bits required to be communicated between processing nodes in the network, and whenever the number of spikes is zero the corresponding weights (divided by $\omega$) need not be applied (since a multiplication by zero is always zero).

Figure 7:
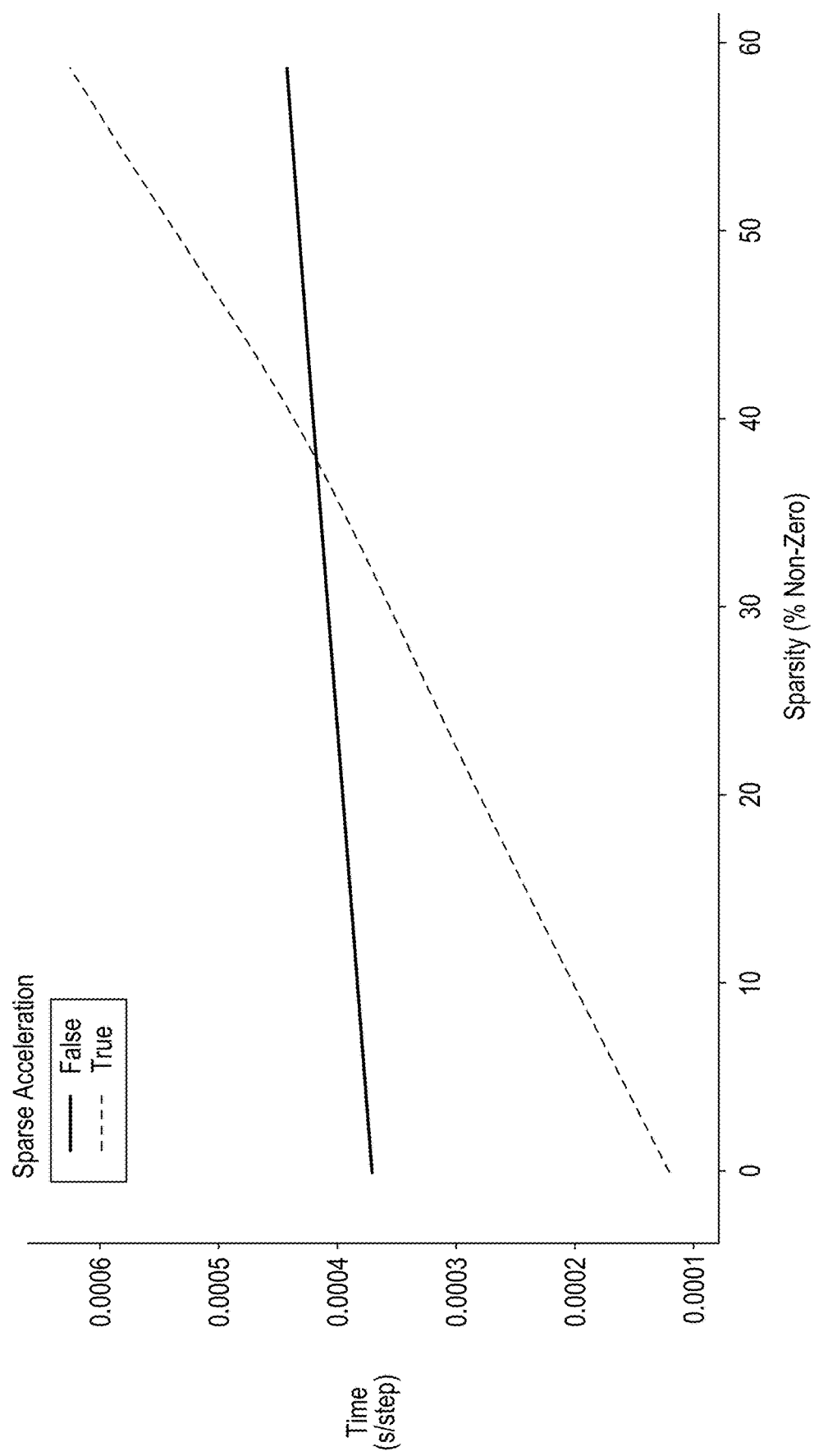
FIG. 7 illustrates the speed-up obtained by the use of sparse MACs in digital hardware. In particular, when less than approximately 40% of the neurons are spiking on any given time-step, it becomes advantageous to skip the associated weight lookups and multiplications.

To demonstrate, we created a network in Nengo with a 1024×1024 weight matrix, and varied the parameters of the simulation to control the sparsity (the proportion of activities that are non-zero on any given time-step) in two conditions: one where the all of the connection weights are applied (sparse=False) (701), and another where any time the number of spikes is zero the associated column of weights are skipped and not multiplied nor accumulated (sparse=True) (702). For the latter to be efficient, the connection weights are represented in Fortran (column-major) order. FIG. 7 illustrates that this optimization is advantageous when the proportion of non-zero spike counts is less than ~40%. When this sparsity is close to 0%, the inference time is improved by as much as ~3× (including all other overhead in the simulation).

Lastly, we compared the total time taken to generate Nengo's documentation examples (nengo/tests/test_examples.py) under a number of conditions on the same CPU: (1) Nengo v3.0.0 core using the NumPy backend; (2) a baseline implementation of Nengo using C; (3) an improvement to the second condition that skips the MACs associated with applying connection weights to neural activities when the number of spikes are zero; and (4) an improvement to the third condition that also skips any MACs associated with applying connection weights to any zero values (e.g., user inputs, and linear combinations of spiking neuron models or other nonlinearities).

| Method | Median Test Time (s) | Relative Speedup (x Baseline) |
| --- | --- | --- |
| Nengo v3.0.0 (NumPy core) | 210.92 s | 0.66× (*) |
| Baseline C implementation | 140.02 s | 1× |
| Sparse neurons | 113.19 s | ~1.24× |
| Sparse signals | 111.48 s | ~1.26× |

Overall, this demonstrates clear benefits in efficiency to using Algorithms 1, 2, 3 and 4, in order to temporally sparsify signals, and in a manner that said benefits are explicitly linked to the technical implementation of the system in digital hardware.

Exemplary Application—Algorithmic Efficiency on Digital Hardware

Spike traffic is one of the most energy-intensive parts of simulating a network that is too large to fit on one computing device. This is because every single spike from some source neuron to one or more destination devices results in a multicast packet, and each such packet pays significant overhead in travelling a relatively long distance. However, these packets have the ability to carry additional information on digital hardware such as SpiNNaker (Furber et al., 2014). We have significant freedom to play with the contents and semantics of each packet, in order to optimize given cost models of operation.

Meanwhile, we must consider that the precision of rate-based computation is $O(\tau n)$ while the precision of spike-based computation is $O(\tau\sqrt{n})$ as detailed by Voelker (2019). There is an unexplored space in between these two extremes of transmitting real (floating point) values and spike (single bit) events, as characterized by the multi-bit spiking models of Algorithms 1, 2, 3, and 4.

Here, we connect these two issues together. We decouple the time-step that is local to each neuron model ($\omega$) from the time-step of the simulation, and transmit the integer number of spikes with some encode-decode protocol. We then parameterize key relationships between energy cost and noise. This explicitly links the key features of Algorithms 1, 2, 3 and 4, to their technical implementation in digital hardware, and in doing so characterizes the resulting benefits of our invention.

To provide an example, we focus on Algorithm 2. Stochastic rounding essentially distributes quantization errors evenly over time without requiring any additional memory. To implement this in digital hardware, one may:
 (a) Evaluate the nonlinearity with a lookup table or dedicated hardware accelerator.
 (b) Multiply by $\omega$.
 (c) Generate a uniform random sample in parallel with a dedicated RNG accelerator.
 (d) Round up or down by comparing the truncation error to the random sample, using an if statement on the CPU.

Operations may be fused together with special-purpose digital logic, for example, the multiplication of ω with the calculation of the truncation error, or the 'if' comparison with the rounding computation.

This algorithm requires no extra memory, is relatively cheap to compute, and scales with zero-mean error and an SNR of $\Omega(\omega\sqrt{\tau})$. In particular, on any given time-step, the unfiltered variance is $((1-t)t)/\omega^2$, where $t=a\omega-\lfloor a\omega \rfloor$ is the truncation error for the given aω (recall the SNR is the signal divided by the square root of its variance). This is shown as follows:

$$V[\tilde{a} - a] = E[(\tilde{a} - a)^2]$$
$$= \omega^{-2}E[(\text{Round}(x) - x)^2]$$
$$= \omega^{-2}((\lfloor x \rfloor - x)^2(1 - (x - \lfloor x \rfloor)) + (\lfloor x \rfloor + 1 - x)^2(x - \lfloor x \rfloor))$$
$$= \omega^{-2}(1 - t)t.$$

Note, since 0≤t<1 we have the bounds $0 \leq V[\tilde{a}-a] \leq \frac{1}{4}\omega^{-2}$, where the lower-bound is achieved at t=0 and the upper-bound is achieved at t=½. We can show that t tends to 0 for $\omega \ll a^{-1}$ as each time-step usually emits no spikes (t=x→0). Conversely t tends to ½ for $\omega \gg a^{-1}$. In summary, we have the SNR lower-bounded by 2ωa. The same also applies to Algorithms 1 and 4 by use of the law of the Unconscious Statistician':

$$V[\tilde{a} - a] = \omega^{-2}E[(\text{Count}(x; g) - x)^2]$$
$$= \omega^{-2}\left(\int_0^{1-t} g(-t)^2 \, dg + \int_{1-t}^1 g(1-t)^2 \, dg\right)$$
$$= \omega^{-2}((-t)^2(1 - t) + (1 - t)^2 t)$$
$$= \omega^{-2}(1 - t)t.$$

For Algorithm 2 we get exactly $V[\tilde{a}-a]=a/\omega$, or an SNR of exactly $\sqrt{(\omega a)}$, by properties of the Poisson distribution.

The next ingredient is the energy cost model. This is a metric that we wish to minimize, which will depend on how information is coded, and inform trade-offs between the choice of Algorithms 1, 2, 3, and 4, the parameters of the network, and the resulting accuracy. For simplicity, assume a linear energy model:

$$C = e_0 + e\Sigma_{i=0}^{n-1} k_i$$

where $e_0$ is some overhead cost, e is the cost per bit, and $k_i$ is the number of transmitted bits for the $i^{th}$ neuron. Using a code that simply represents the number of spikes in binary for each neuron:

$$k_i = \lceil \log_2 L \rceil$$

However this value of k is independent of i and the sparsity of the spike-trains. In contrast, a code that is still fairly simple to encode and decode but scales with the activity of the population to exploit preference for sparsity is the following variable-length code. Let $m_i = \tilde{a}\omega$ be the integer transmitted by the $i^{th}$ neuron. In the simplest scheme, each neuron can use $\lceil \log_2(m_i+1) \rceil$ unary bits to indicate the binary length of $m_i$, plus a sentinel zero bit, followed by $\lceil \log_2(m_i+1) \rceil$ more bits giving the binary representation of $m_i$. The benefit of this protocol is that all of the neurons can be stacked together without ambiguity, and with bit-length that scales with each activation level (although zero spikes still requires one sentinel bit). In total:

$$k_i = 1 + 2\lceil \log_2(m_i+1) \rceil$$

An example of a more sophisticated coding scheme would be Huffman coding, which is optimal assuming we know the distribution of $m_i$ apriori.

Now, focusing on Algorithms 1 and 2, we address how the signal-to-noise ratio in the transmitted quantity scales with the number of bits per augmented nonlinearity. This is a natural metric since it is the reciprocal of: RMSE over signal RMS (also known as the normalized RMSE), which is interpretable as a percent error. In other words the following SNR is a percent measure of precision:

if ωa≥½, then SNR=2ωa; else $\sqrt{(\omega a(1-\omega a)^{-1})}$.

The lower-bound is given by the upper-bound on the variance. The first piecewise condition is obtained when t=½ and the second is a tighter bound that is achieved when t=x=ωa<½.

To put this in context, this means that if on average a neuron spikes at least once every two time-steps then its SNR is at least 100% (signal≥noise). Higher spike-rates, longer time-steps, spatial weighting, and synaptic filtering will all boost SNR.

Now the number of bits for a given neuron is:

$$k = 1 + 2\lceil \log_2(m+1) \rceil 1 + 2 \log_2(\omega a + 1)$$

$$\Rightarrow \omega a \approx 2^{(k-1)/2} - 1$$

Plugging this into the SNR assuming ωa≥½:

$$SNR \geq 2\omega a \approx 2(2^{(k-1)/2} - 1)$$

Thus energy grows logarithmically with SNR when spiking at least once every two time-steps. If ωa<½, then:

$$SNR \geq \sqrt{(\omega a(1-\omega a)^{-1})} \approx \sqrt{((2^{(k-1)/2}-1)(2-2^{(k-1)/2})^{-1})}$$

These formulas relate SNR to the number of bits needed to transmit a given neuron's activities. Likewise, the energy model relates the number of bits to the energy required to communicate those activities in the hardware implementation. Taken together, these metrics can be optimized by an learning algorithm within an overall cost function, or similarly used as regularization terms during training.

More generally, given the number of spikes output by each augmented nonlinearity and the available number of bits to communicate activities, these formulas can be used to determine the costs that must be balanced for efficient implementation on hardware.

Furthermore, mechanisms within the network, or external to the network, can dynamically control, distribute, allocate, or manage the time-steps of each augmented nonlinearity in order to balance communication demands with the required precision of each neuron and adaptively scale resources where needed given the constraints of the hardware implementation.

In particular, given a finite amount of energy made available at runtime on the device(s), a time-step can be chosen for each augmented nonlinearity as the network is running, depending on where the precision or SNR is most needed for a particular workload. This determination can be made on the basis of internal errors within the network, learned attentional mechanisms, or external input, in combination with formulas derived for spiking precision and the energy requirements of the digital implementation.

Figure 12A:
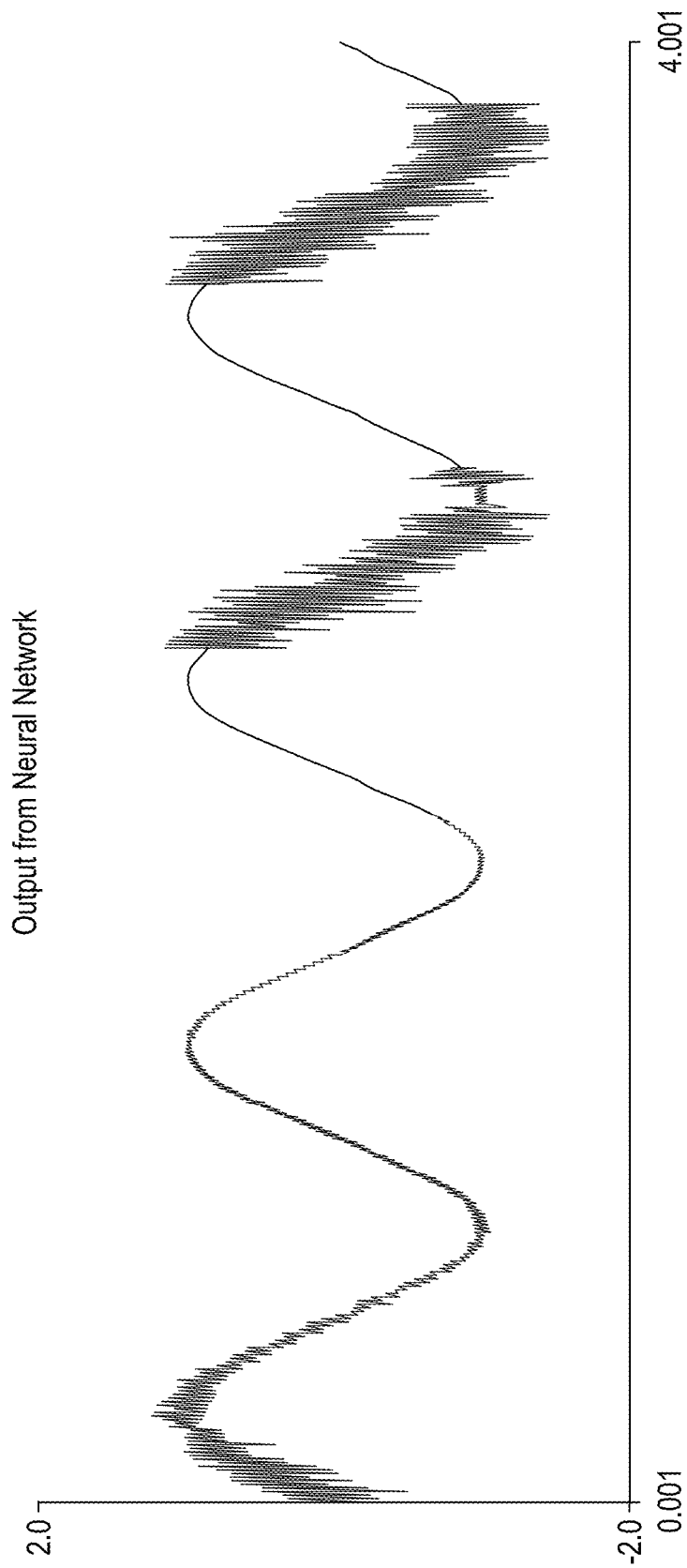
FIGS. 12A-12C illustrate the adaptive management of time-steps, local to each augmented nonlinearity (i.e., the maximum number of bits per multi-bit spike packet), in order to dynamically control the accuracy of the neural network, at the cost of increasing the average number of spikes that are output per neuron per step.
Figure 12B:
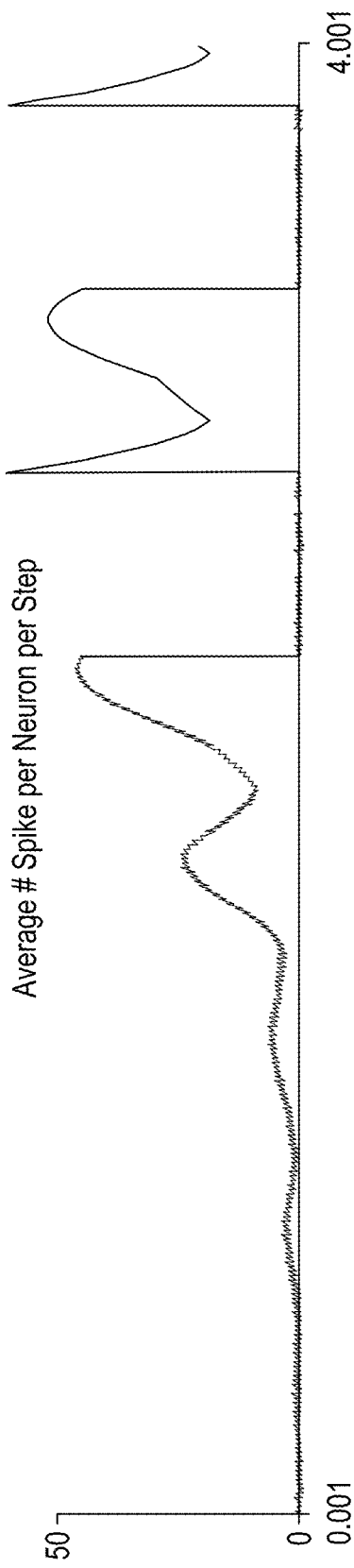
Figure 12C:
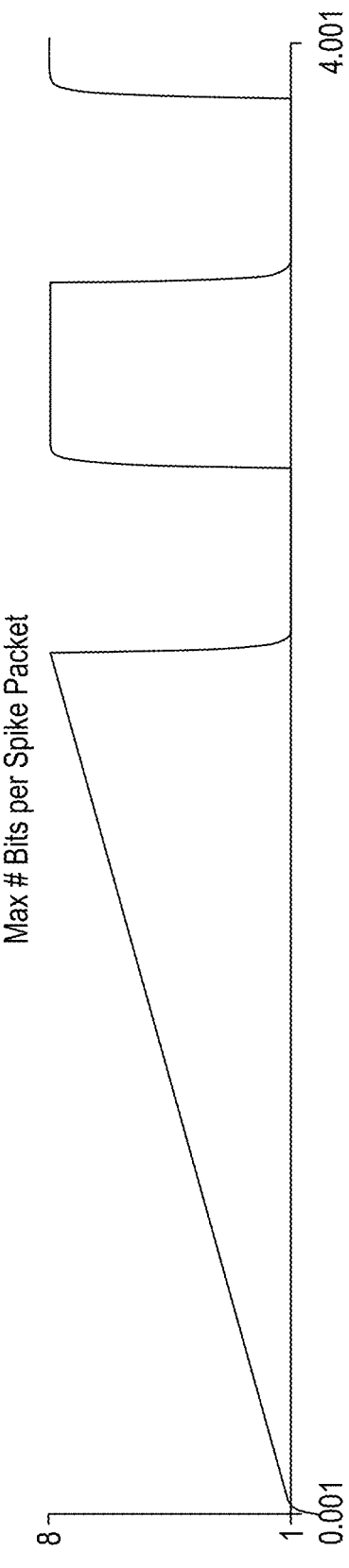

FIG. 12 illustrates this adaptive selection of time-steps for a network of neurons encoding a sine wave. The accuracy of the decoded reconstruction of this sine wave (1201) depends on the maximum allowable number of bits per spike packet, which can vary dynamically as the time-step size changes (1203). Changes to maximum number of bits per spike packet are in turn reflected in the average number of spikes emitted per neuron per timestep (1202). Increasing the maximum number of bits per multi-bit spike packet improves the accuracy of the neural network, but at the cost of increasing the average number of spikes that are output per neuron per step. FIG. 12 thereby provides a concrete illustration of the accuracy versus efficiency tradeoffs that are made possible by the present invention.

Discussions

Although the biological plausibility of a neuron that can output more than one spike "at once" is questionable, it is in fact mathematically equivalent to simulating the neuron with a time-step of ω and bundling the spikes together (Krithivasan et al., 2019). Consequently, all of the networks we consider here can be implemented in 1-bit spiking networks, although with an added time cost. This is similar to the LSNN's approach of simulating the network for two time-steps per image pixel, but does not incur the same cost in throughput. Alternatively, a space cost can be paid by replicating the neuron ω times and uniformly spacing the initial v0 (not shown). Likewise, negative spikes are a more compact and efficient alternative to duplicating the neurons and mirroring their activation functions.

Our methods are convenient to apply to the LMU because we can account for the dynamics of the lowpass filter, and the me vector naturally prefers the zero (i.e., silent) state. At the same time, it is a challenging test for the theory, since we do not train the LMU matrices, which are primarily responsible for accuracy on psMNIST (Voelker et al., 2019), and RNNs tend to accumulate and propagate their errors over time. Notably, the method of Algorithm 1 can be applied to other neural network architectures, including feed-forward networks.

We have presented a new algorithm and accompanying methods that allow interpolation between spiking and non-spiking networks. This allows the training of hSNNs, which can have mixtures of activity quantization, leading to computationally efficient neural network implementations. We have also shown how to incorporate standard SNN assumptions, such as the presence of a synaptic filter.

We demonstrated the technique on the recently proposed LMU, and achieved better than state-of-the-art results on sMNIST in comparison to a spiking network. Additionally, on the more challenging psMNIST task the reported accuracy of the spiking network is better than any non-spiking RNN apart from the original LMU (Chandar et al., 2019; Voelker et al., 2019).

However, our focus here is not on accuracy per se, but efficient computation. In this context, the training procedure enables us to leverage the accuracy of ANNs and the energy efficiency of SNNs by scheduling training to evaluate a series of networks in between these two extremes. In the cases we considered, we reduced the activity to 2-6 bits on average, saving at least 26 bits over the standard LMU implementation with minimal impact on accuracy.

While difficult to convert these metrics to energy savings in a hardware-agnostic manner, such optimizations can benefit both spiking and non-spiking architectures in their effects from temporal sparsification, namely: reducing communication between processing nodes in the neural network, reducing the number of significant bits involved in MAC operations, and reducing the overall number of MACs.

We anticipate that techniques like those we have outlined here will become more widely used as the demands of edge computing continue to grow. In such power-constrained contexts, extracting as much efficiency as possible, while retaining sufficient accuracy, is central to the efforts involved in co-designing both algorithms and hardware for neural network workloads.

What is claimed is:

1. A method for producing neural network output for a machine learning task, the method implemented with a processor in digital hardware comprising at least one microcontroller or integrated circuit, the method comprising:
   providing a non-spiking neural network comprising one or more processing nodes that each implement a nonlinear function;
   augmenting, using temporal dithering, by the at least one microcontroller or integrated circuit, at least one nonlinear function of the neural network to provide at least one augmented neural nonlinearity, the augmenting comprising:
      evaluating, by the at least one microcontroller or integrated circuit, an output of the at least one nonlinear function;
      multiplying, by the at least one microcontroller or integrated circuit, the output of the at least one nonlinear function with a time-step parameter to obtain a first result corresponding to a number of spikes;
      producing, by the at least one microcontroller or integrated circuit, a multi-bit spike output for the at least one augmented neural nonlinearity, the producing comprising dividing a second result by the time-step parameter, the second result being obtained from the first result;
   training, by the at least one microcontroller or integrated circuit, the neural network with the at least one augmented neural nonlinearity while adjusting the time-step parameter to reduce quantization error, to provide a trained neural network with at least one augmented neural nonlinearity; and
   operating, by the at least one microcontroller or integrated circuit, the trained neural network with the at least one augmented neural nonlinearity to produce a temporally sparse sequence of multi-bit spikes in response to input signals.

2. The method of claim 1, wherein the augmenting comprises, after the multiplying, one of:
   adding the first result to a voltage state variable for tracking the quantization error to obtain a sum;
   rounding down the sum to a rounded value that is a nearest integer value; and
   subtracting the rounded value from the voltage state value to obtain the second result;
   or,
   computing a truncation error;
   generating a random sample from a U[0, 1) distribution;
   upon a condition in which the truncation error is less than the random sample, rounding down the first result to a nearest integer to provide the second result, otherwise rounding up to obtain the second result;
   or,
   generating a random sample from a Poisson distribution with a given expectation to obtain the second result.

3. The method of claim 1, wherein the at least one nonlinear function comprises a linear combination of one or more nonlinear functions.

4. The method of claim 1, wherein the at least one nonlinear function is selected to restrict a domain of integers corresponding to the number of spikes.

5. The method of claim 1, wherein the non-spiking neural network is a trained non-spiking neural network.

6. The method of claim 1, wherein the time-step parameter is adjusted using a training scheduler.

7. The method of claim 1, wherein training the neural network with the at least one augmented neural nonlinearity employs gradients approximated using a gradient of one of the at least one nonlinear function or a surrogate gradient of the at least one nonlinear function.

8. The method of claim 1, wherein a loss function for training the neural network with the at least one augmented neural nonlinearity includes a regularization term comprising a function of a number of spikes generated by each augmented neural nonlinearity.

9. The method of claim 1, wherein adjusting the time-step parameter comprises adjusting the time-step parameter to minimize a cost function that models performance metrics of a computer processor.

10. The method of claim 1, wherein the at least one nonlinear function is implemented with a lookup table in static random access memory, offloaded onto a dedicated hardware accelerator, computed with a fixed-point arithmetic logic unit, computed with a floating point unit, or a combination of two or more of the foregoing.

11. The method of claim 1, wherein the dividing is fused with operations applied by downstream connection weights, and the temporally sparse sequence of multi-bit spikes is encoded into one or more multi-bit packets and compressed to reduce a volume of communication between processing nodes, and decompressed before applying the downstream connection weights.

12. A computer system comprising:
at least one hardware processor and memory configured to, for a non-spiking neural network comprising one or more processing nodes that each implement a nonlinear function:
augment, using temporal dithering, at least one nonlinear function of the neural network to provide at least one augmented neural nonlinearity, the augmenting comprising:
evaluating an output of the at least one nonlinear function;
multiplying the output of the at least one nonlinear function with a time- step parameter to obtain a first result corresponding to a number of spikes; and
producing a multi-bit spike output for the at least one augmented neural nonlinearity, the producing comprising dividing a second result by the time-step parameter, the second result being obtained from the first result;
training the neural network with the at least one augmented neural nonlinearity while adjusting the time-step parameter to reduce quantization error, to provide a trained neural network with at least one augmented neural nonlinearity; and
operating the trained neural network with the at least one augmented neural nonlinearity to produce a temporally sparse sequence of multi-bit spikes in response to input signals.

13. The computer system of claim 12, wherein the augmenting comprises, after the multiplying:
adding the first result to a voltage state variable for tracking the quantization error to obtain a sum;
rounding down the sum to a rounded value that is a nearest integer value; and
subtracting the rounded value from the voltage state value to obtain the second result.

14. The computer system of claim 12, wherein the augmenting comprises, after the multiplying:
computing a truncation error;
generating a random sample from a U[0, 1) distribution;
upon a condition in which the truncation error is less than the random sample, rounding down the first result to a nearest integer to provide the second result, otherwise rounding up to obtain the second result.

15. The computer system of claim 12, wherein the augmenting comprises, after the multiplying:
generating a random sample from a Poisson distribution with a given expectation to obtain the second result.

16. The computer system of claim 12, wherein the at least one nonlinear function comprises a linear combination of one or more nonlinear functions.

17. The computer system of claim 12, wherein the at least one nonlinear function is selected to restrict a domain of integers corresponding to the number of spikes.

18. The computer system of claim 12, wherein the non-spiking neural network is a trained non-spiking neural network.

19. The computer system of claim 12, wherein the time-step parameter is adjusted using a training scheduler.

20. The computer system of claim 12, wherein:
training the neural network with the at least one augmented neural nonlinearity employs gradients approximated using a gradient of one of the at least one nonlinear function or a surrogate gradient of the at least one nonlinear function,
and/or
a loss function for training the neural network with the at least one augmented neural nonlinearity includes a regularization term comprising a function of a number of spikes generated by each augmented neural nonlinearity.

21. The computer system of claim 12, wherein adjusting the time-step parameter comprises adjusting the time-step parameter to minimize a cost function that models performance metrics of a computer processor.

22. The computer system of claim 12, wherein the at least one nonlinear function is implemented with a lookup table in static random access memory, offloaded onto a dedicated hardware accelerator, computed with a fixed-point arithmetic logic unit, computed with a floating point unit, or a combination of two or more of the foregoing.

23. The computer system of claim 12, wherein the dividing is fused with operations applied by downstream connection weights, and the temporally sparse sequence of multi-bit spikes is encoded into one or more multi-bit packets and compressed to reduce a volume of communication between processing nodes, and decompressed before applying the downstream connection weights.

* * * * *